US008825289B2

(12) United States Patent
Daly et al.

(10) Patent No.: US 8,825,289 B2
(45) Date of Patent: Sep. 2, 2014

(54) METHOD AND APPARATUS FOR INTEGRATION OF FACTORY AND AFTERMARKET VEHICLE COMPONENTS

(71) Applicants: Charles David Daly, Somerville, NJ (US); William H Jones, Jr., Ormond Beach, FL (US)

(72) Inventors: Charles David Daly, Somerville, NJ (US); William H Jones, Jr., Ormond Beach, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 13/826,382

(22) Filed: Mar. 14, 2013

(65) Prior Publication Data
US 2013/0197753 A1 Aug. 1, 2013

Related U.S. Application Data

(63) Continuation-in-part of application No. 13/539,965, filed on Jul. 2, 2012, now Pat. No. 8,527,147, which is a continuation of application No. 12/545,429, filed on Aug. 21, 2009, now Pat. No. 8,214,105.

(51) Int. Cl.
*G06F 7/00* (2006.01)

(52) U.S. Cl.
USPC .............. 701/36; 709/224; 370/512; 370/416

(58) Field of Classification Search
USPC ......... 701/36; 702/57, 66; 370/252, 254, 257, 370/416, 512; 340/259; 375/240; 705/75, 705/95, 93; 709/224
See application file for complete search history.

(56) References Cited

U.S. PATENT DOCUMENTS 3,903,472 A 9/1975 Wahl
4,771,283 A 9/1988 Imoto
(Continued)

FOREIGN PATENT DOCUMENTS

CA 2708665 A1 2/2011
CN 2004 1 0030511 3/2004
(Continued)

OTHER PUBLICATIONS

Efficient annotation of video for vehicle type classification;Zezhi Chen ; Ellis, T. ;Intelligent Transportation Systems—(ITSC), 2013 16th International IEEE Conference on; Digital Object Identifier: 10.1109/ITSC.2013.6728211; Publication Year: 2013 , pp. 59-64.*

(Continued)

Primary Examiner — Cuong H Nguyen
(74) Attorney, Agent, or Firm — J. Wiley Horton

(57) ABSTRACT

An interface and corresponding method, where the interface is connected via a first connection to a factory data bus of a vehicle which transports signals according to a first data format, and further connected via a second connection to a data channel of the aftermarket component which transports signals according to a second data format. The interface identifies a factory data bus type corresponding to the factory data bus, out of a plurality of potential factory data bus types. The interface receives digital signals from the aftermarket component via the second connection, the digital signals being in the second data format which corresponds to the aftermarket component. The interface translates the digital signals into the first data format which corresponds to the identified factory bus type. The interface transmits the translated digital signals in the first data format to the vehicle via the first connection.

26 Claims, 13 Drawing Sheets

(56) References Cited

U.S. PATENT DOCUMENTS

| | | | |
|---|---|---|---|
| 4,792,783 A | 12/1988 | Burgess et al. | |
| 4,831,560 A * | 5/1989 | Zaleski | 701/36 |
| 4,964,076 A * | 10/1990 | Schurk | 710/107 |
| 5,339,362 A | 8/1994 | Harris | |
| 5,559,499 A | 9/1996 | Haubner | |
| 5,790,065 A | 8/1998 | Yaroch | |
| 5,790,481 A | 8/1998 | Meitner | |
| 5,903,259 A | 5/1999 | Brusky et al. | |
| 5,999,996 A | 12/1999 | Dunn | |
| 6,005,488 A | 12/1999 | Symanow et al. | |
| 6,009,363 A * | 12/1999 | Beckert et al. | 701/1 |
| 6,032,089 A | 2/2000 | Buckley | |
| 6,067,302 A | 5/2000 | Tozuka | |
| 6,097,520 A | 8/2000 | Kadnier | |
| 6,114,970 A | 9/2000 | Kirson et al. | |
| 6,141,710 A | 10/2000 | Miesterfeld | |
| 6,148,251 A | 11/2000 | Downs | |
| 6,253,131 B1 | 6/2001 | Quigley et al. | |
| 6,396,164 B1 | 5/2002 | Barnea et al. | |
| 6,397,186 B1 | 5/2002 | Bush et al. | |
| 6,529,124 B2 * | 3/2003 | Flick | 340/426.1 |
| 6,587,443 B1 * | 7/2003 | Dutta | 370/322 |
| 6,674,750 B1 * | 1/2004 | Castellano | 370/354 |
| 6,729,432 B1 | 5/2004 | Yao et al. | |
| 6,823,457 B1 | 11/2004 | Berstis et al. | |
| 6,862,357 B1 | 3/2005 | Albus et al. | |
| 6,862,505 B2 | 3/2005 | Satoh et al. | |
| 6,865,460 B2 | 3/2005 | Bray et al. | |
| 6,907,328 B2 | 6/2005 | Fehr et al. | |
| 6,956,952 B1 | 10/2005 | Riggs | |
| 7,020,289 B1 | 3/2006 | Riggs | |
| 7,103,008 B2 * | 9/2006 | Greenblat et al. | 370/258 |
| 7,126,583 B1 | 10/2006 | Breed | |
| 7,177,730 B2 | 2/2007 | Daly et al. | |
| 7,222,207 B2 | 5/2007 | Falcon | |
| 7,254,482 B2 | 8/2007 | Kawasaki et al. | |
| 7,275,027 B2 | 9/2007 | Sproule et al. | |
| 7,295,608 B2 | 11/2007 | Reynolds et al. | |
| 7,302,312 B2 * | 11/2007 | Murray et al. | 700/250 |
| 7,372,837 B2 | 5/2008 | Kinjo et al. | |
| 7,450,961 B1 | 11/2008 | Heubel et al. | |
| 7,489,786 B2 | 2/2009 | Marlowe | |
| 7,496,434 B2 | 2/2009 | Fossen et al. | |
| 7,596,636 B2 | 9/2009 | Gormley | |
| 7,676,062 B2 | 3/2010 | Breed et al. | |
| 7,684,570 B2 | 3/2010 | Riggs | |
| 7,689,198 B2 | 3/2010 | Deng et al. | |
| 7,769,342 B2 | 8/2010 | Tabe | |
| 8,014,540 B2 | 9/2011 | Riggs | |
| 8,014,920 B2 | 9/2011 | Daly et al. | |
| 8,036,265 B1 | 10/2011 | Reynolds et al. | |
| 8,473,992 B2 * | 6/2013 | Nakano | 725/96 |
| 2002/0084910 A1 | 7/2002 | Owens et al. | |
| 2003/0007649 A1 | 1/2003 | Riggs | |
| 2004/0045030 A1 | 3/2004 | Reynolds et al. | |
| 2004/0138795 A1 | 7/2004 | Alkarawi et al. | |
| 2005/0125121 A1 | 6/2005 | Isaji et al. | |
| 2005/0249358 A1 | 11/2005 | Riggs | |
| 2006/0052167 A1 | 3/2006 | Boddicker et al. | |
| 2006/0198535 A1 | 9/2006 | Riggs | |
| 2006/0200364 A1 | 9/2006 | Riggs | |
| 2006/0213755 A1 | 9/2006 | Chang et al. | |
| 2007/0140187 A1 | 6/2007 | Rokusek et al. | |
| 2007/0208469 A1 | 9/2007 | Wille et al. | |
| 2007/0282506 A1 | 12/2007 | Breed et al. | |
| 2008/0065291 A1 | 3/2008 | Breed | |
| 2008/0096654 A1 | 4/2008 | Mondesir et al. | |
| 2008/0130912 A1 | 6/2008 | Marlowe | |
| 2008/0144705 A1 | 6/2008 | Rackin et al. | |
| 2008/0246850 A1 | 10/2008 | Marlowe | |
| 2009/0010448 A1 | 1/2009 | Voto et al. | |
| 2009/0034750 A1 | 2/2009 | Ayoub et al. | |
| 2009/0062982 A1 | 3/2009 | Obata et al. | |
| 2009/0075624 A1 | 3/2009 | Cox et al. | |
| 2009/0150942 A1 * | 6/2009 | Nakano | 725/75 |
| 2009/0189373 A1 | 7/2009 | Schramm et al. | |
| 2010/0040237 A1 | 2/2010 | Riggs | |
| 2010/0226278 A1 | 9/2010 | Borsos et al. | |
| 2010/0233965 A1 | 9/2010 | Fukuoka | |
| 2010/0268426 A1 | 10/2010 | Pathak et al. | |
| 2010/0312433 A1 | 12/2010 | Preston et al. | |
| 2011/0022766 A1 * | 1/2011 | Beckmann et al. | 710/305 |
| 2011/0046788 A1 | 2/2011 | Daly et al. | |
| 2011/0046816 A1 | 2/2011 | Daly et al. | |
| 2011/0169750 A1 | 7/2011 | Pivonka et al. | |

FOREIGN PATENT DOCUMENTS

| | | |
|---|---|---|
| GB | 2460923 A | 12/2009 |
| JP | 2006-073712 A | 3/2006 |
| JP | 2007-219283 A | 8/2007 |
| JP | 2009-051334 A | 3/2009 |
| MX | 2010008517 A | 7/2011 |
| TW | 94109467 | 3/2005 |
| WO | 2005/096310 A1 | 10/2005 |
| WO | 2007/111177 A1 | 10/2007 |
| WO | 2011/088218 A1 | 7/2011 |

OTHER PUBLICATIONS

Application of in-vehicle data buses for collision avoidance systems; Home, W.D.; Olechna, E.P.; Bruno, R.; Intelligent Transportation System, 1997. ITSC '97., IEEE Conference on; Digital Object Identifier: 10.1109/ITSC.1997.660514 Publication Year: 1997, pp. 433-438.*
PAC SWI-Jack Universal Steering Wheel Control Interface—Installation Instructions (date unknown).
PAC SWI-X Universal Steering Wheel Control Interface—Installation Instructions (date unknown).
PAC SWI-CAN CAN-Data BUS Steering Wheel Control Interface for use with a SWI-ECL, SWI-JACK, SWI-PS, or SWI-X—Installation Instructions (date unknown).
Peripheral Electro. PESWICAN2-CAN Data BUS Steering Wheel Interface For Use With a PESWIAKJC. PESWIECL, PESWIPS or PESWIX—Installation Instructions (date unknown).
Wiring Diagram for 1998 Cadillac Seville (date unknown).
Soundgate REMPIOTOY Installation Instructions (date unknown).
Soundgate REMPIOGMV2 Installation Instructions (date unknown).
Peripheral Electronics News Room—Wanted: SKU Killer for Chrysler, Dodge & Jeep, CHYAH08 (Apr. 1, 2009).
A Survey of Challenges Related to the Design of 3D User Interfaces for Car Driers; Tonnis, M.;; Broy, V.; Kinker, G.; 3D User Interfaces, 2006. 3DUI 2006. IEEE Symposium on; Digital Object Identifier: 10.1109/VR,.2006.19 Publication Year: 2006, pp. 127-134.
Eye gaze and movement behaviour in the operation of adaptive in-car touchscreens; Bachfischer, K; Waeller, C; Troesterer, S.; Tatzel, A.; Leon, F.P.; Intelligent Vehicles Symposium, 2008 IEEE; Digital Object Identifier: 10.1109/IVS.2008.4621138 Publication Year: 2008, pp. 1027-1032.
An Eyes-Free In-car User Interface Interaction Style Based on Visual and Textual Mnemonics, Chording and Speech; Sandnes, F.E.; Yo-Ping Huang; Yeh-Min Huang; Multimedia and Ubiquitous Engineering, 2008, MUE 2008. International Conference on Digital Object Identifier: 10.1109/MUE.2008.50; Publication Year: 2008, pp. 342-347.
A haptically enabled CAN-based steering wheel controller; Hogan, P.; Nahavandi, S.; Mullins, J.; Industrial Electronics & Applications (ISIEA), 2010 IEEE Symposium on; Digital Object Identifier: 10.1109/ISIEA.2010.5679418 Publication year: 2010, pp. 487-492.
PAC SWI-2 Steering Wheel Radio Control Interface Packaging (2000) and Installation instructions (Jul. 11, 2001 revision), 4 pgs.
Soundgate Interfaces, Winter/Spring 1997 Product Guide (1996).
Soundgate Interfaces, Spring 1997 Product Catalog (1997).
Soundgate Interfaces, Winter 1998 Product Catalog (1998).
Soundgate Interfaces FRDSW1 Packaging (1997) and Installation Instructions (1996-1998).
Soundgate Interfaces GMSW1 Packaging (date unknown) and Installation Instructions (1996-1998).

(56) References Cited

OTHER PUBLICATIONS

Sonicelectronix.com, Axxess ASWC Universal Steering Wheel Control Interface, Product Sales page (captured Sep. 8, 2010).

AXXESS Catalog, Retain Steering Wheel Controls, 2008.

OEM Steering Control Interface for Parrot Bluetooth CK3000, InCarTec (date unknown).

"Soundgate Dealers", Apr. 29, 1998.

Soundgate #FRDSW2 Installation Instructions, Oct. 10, 1998.

"Announcing . . . The SoundGate Steering Wheel Control Interface for Alpine Receivers", Sep. 10, 1999.

GMSW1, and SWC2 thru SWC9 Installation instructions, 1997.

"New Machines", Car Audio and Electronics, Sep. 1997, pp. 20-24.

"Lightning Audio's Steering Wheel Control Module", Car Audio and Electronics, Sep. 1999, pp. 90-93.

Study on Identification of Driver's Intentions Based on Cloud Model; Bai Jingwen; Zhang Licai; E-Product E-Service and E-Entertainment (ICEEE), 2010 International Conference on; Digital Object Identifier: 10.1109/ICEEE.2010.5660134 Publication Year: 2010, pp. 1-4.

http://compare.ebay.com/like/290525894581?ltyp=AllFixedPriceItemTypes&var=-sbar&rvr.sub.--id=211166428650&crip=1.sub.--263602.sub.--304662&UA=WXI7&GU-ID=5790a65b12c0a0e203e7e4a7ff52a5e8&itemid=290525894581&ff4=263602.sub.--3- 04662 (for Cadillac Escalade steering wheel controls posted on eBay Feb. 21, 2011).

SAAB bluetooth 98-93 hand free (date unknown).

Terrain mapping for autonomous vehicle by training; Ho Yeong Khing; Soon Ing Yaan; Sim Ai Poh; Tan Chee Wah; Motion Control Proceedings, 1993., Asia-Pacific Workshop on Advances in; Digital Object Identifier: 10.1109/APWAM.1993.316206; Publication Year: 1993, pp. 153-158.

Development of New Mobility Assistive Robot for Elderly People with Body Functional Control; Kaneshige, Y.; Nihei, M.; Fujie, M.G.; Biomedical Robots and Biomechatronics, 2006. BioRob 2006. The First IEEE/RAS-EMBS International Conference on; Digital Object Identifier: 10.1109/BIOROB.2006.1639070; Publication Year: 2006, pp. 118-123.

Active Four-Wheel-Steering Design for an Advanced Vehicle; Leucht, Philip M.; American Control Conference, 1988; Publication Year: 1988, pp. 2379-2384.

* cited by examiner

METHOD AND APPARATUS FOR INTEGRATION OF FACTORY AND AFTERMARKET VEHICLE COMPONENTS

This application is a continuation-in-part of U.S. patent application Ser. No. 13/539,965, filed on Jul. 2, 2012, which is a continuation of U.S. patent application Ser. No. 12/545,429, filed on Aug. 21, 2009, the full content of which is hereby incorporated by reference.

BACKGROUND OF THE INVENTION

1. Field of the Invention

This invention generally relates to providing control signals to an aftermarket component installed in a vehicle. More specifically, the invention relates to a steering wheel control interface that can detect particular vehicle and aftermarket component configurations and properly transmit steering wheel control signals to the aftermarket component.

This invention also generally relates to providing two-way (bi-directional) translation of signals between factory vehicle modules and an aftermarket component installed in a vehicle.

2. Description of Related Art

Vehicle owners often seek to replace factory-installed audio and video components with aftermarket components. These aftermarket components often must be hard-wired to a vehicle's factory wiring. This may require that a user connect various power, audio, and video wires, and further that the aftermarket component communicate and operate, in part, through such wiring. Many modern vehicles include controls on their steering wheels for operating factory-installed components. These steering wheel controls (SWC) may, for example, increase the volume of a radio, increase the track of a CD being played, or change from one audio source to another. However, the particular configuration of a vehicle's steering wheel controls differs significantly among vehicle makes, models, and model years. Accordingly, it is very difficult for manufacturers of aftermarket components to provide compatibility between their components and the wide array of steering wheel control configurations.

U.S. Pat. Nos. 7,020,289 and 6,956,952 describe hard-wired interfaces for handling SWC signals. A commercial product similar to such interfaces is a SWI-JACK interface manufactured by the Pacific Accessory Corporation (PAC). The SWI-JACK interface has a wire harness on an input side and an output plug on an output side. To install the input side, an installer first selects a particular wire from among many included on the wire harness. The selection is made based upon a lengthy chart, which indicates suitable wires for particular vehicle makes and models. Once selected, the installer electrically connects the selected wire to a steering wheel audio control wire, which provides an output signal from the steering wheel audio controls. The SWI-JACK interface is geared to audio control wires provided within the steering column or underneath the vehicle's dashboard. To install the output side, the installer couples the output plug to a wired remote-control input on an aftermarket head-unit. Once the input and output sides have been installed, the installer completes installation by adjusting an input switch on the SWI-JACK. The adjustment is made according to the manufacturer of the aftermarket head unit.

There are several drawbacks to an interface such as the SWI-JACK. First, the interface is not designed to function upon installation. Rather, the installer must perform a lengthy programming process, with pressing and releasing the respective buttons on the steering wheel controls according to an installation sequence. The process is not only lengthy, but unforgiving. If the installer does not correctly perform the sequence, he must start the sequence over. Second, there can be several wires provided within a vehicle's steering column or dashboard. As a result, the installer may choose the wrong wire when attempting to electrically connect the interface to the steering wheel audio control wire. This could permanently damage components within the vehicle and compromise vehicle safety. A related drawback results from requiring the installer to choose a particular wire from the many wires of the wiring harness: if the installer selects the wrong wire from the harness, damage or malfunction to either the SWI-JACK or the vehicle can result. Furthermore, an inherent drawback of passive component interfaces, such as the SWI-JACK, is that they are compatible only with a limited number of manufacturers of aftermarket radios.

Another type of interface incorporates wireless transmission to relay SWC signals to the aftermarket component. Products manufactured with this design include the SWI-X interface by PAC and the REMOTE series interface by SoundGate. Generally speaking, these interfaces have a wire harness and an infrared (IR) receiver on an input side, and an IR transmitter on an output side. Installation of the input side proceeds in a manner similar to that described above in connection with the SWI-JACK. Installation of the output side involves mounting and aiming the IR transmitter such that it can communicate with an IR receiver integrated with the aftermarket component.

This design has several limitations, one of which is the lengthy programming process. The input and output sides having been installed, the installer must perform a wireless remote control "learning" process. For each steering wheel audio control button, the installer must use the remote control provided with the aftermarket component to emit an IR signal to the interface's IR receiver. The interface then "learns" the IR signal and stores its signal format for future reproduction, similar to a process used in learning television remote controls. The interface cannot reproduce an IR signal according to the steering wheel audio control inputs until this learning process has been performed.

The wireless interface design also fails to overcome the drawbacks of the SWI-JACK interface. The installer must connect the appropriate steering wheel audio control wire, risking permanent damage and malfunction to the vehicle and the interface. And if the installer incorrectly performs any part of the programming process, he must start over, leading to frustration.

Some methods of communication between a vehicle's electrical components are known. U.S. Pat. Nos. 7,275,027, 6,114,970, 6,823,457, 6,141,710, and 6,396,164 describe interconnections between a factory-configured vehicle bus (OEM bus) and a device bus for aftermarket products and accessories. These interconnections generally use a gateway controller. However, in these devices, the vehicle and device bus structures are predetermined. In this configuration, the gateway controller merely translates between a single set of OEM bus commands and a single set of device bus commands. Thus, these gateway controllers are tied to a specific vehicle bus and/or device bus architecture. Accordingly, they are inapplicable to universal aftermarket products.

In addition to interfacing steering wheel controls with aftermarket stereos, there is also a need in the art to interface other vehicle components to provide the same integrated vehicle experience as factory OEM stereos. For instance, modern-day vehicles include multiple displays to provide the driver and passengers with vehicle information, climate control (HVAC) settings, navigation prompts, backup camera images, Bluetooth call information, and audio and video track information (e.g., current song being played on an AM/FM radio station, or satellite radio station, MP3 song information). If the vehicle even partially relies on the factory stereo to operate these features, such features will conventionally be lost when the factory stereo is replaced with an aftermarket stereo.

Furthermore, many modern vehicles integrate the factory stereo, HVAC controls, and information displays into the vehicle dashboard, such that replacing the factory stereo with an aftermarket stereo often requires removal of the entire dashboard. For the vehicle manufacturers, this approach provides an integrated appearance and also deters the replacement of the factory stereo, encouraging vehicle purchasers to select a premium version of the factory stereo upon purchase. In such an instance, the HVAC controls and information displays may not be re-installable after installation of the aftermarket stereo, as the dashboard panel is not reused.

FIG. 7 shows a system diagram of a data bus 700 and the factory components communicating via the bus, in a conventional vehicle. Vehicle bus 700 is connected to at least one processor, such as vehicle information processor 710. Vehicle information processor 710 processes vehicle information transmitted along vehicle bus 700 to provide a user interface. Examples of such user interfaces include, but are not limited to, GM OnStar, Ford Sync, Chrysler BlueConnect, etc.

Vehicle bus 700 is also connected to various information displays, such as a heads-up display 720, an instrument cluster display 721, and a central information display 722. Heads-up display 720 projects an image onto the windshield, so that the driver is able to view vehicle information without shifting his or her eyes off the road. Instrument cluster display 721 is located within the instrument cluster and provides vehicle information. Central information display 722 is located in the central area of the dashboard and provides vehicle information.

Each display may, by default, display pre-established information types in accordance with any desired format. As one example, heads-up display 720 may customarily display vehicle speed, engine RPM, and/or navigation turn-by-turn prompts, instrument cluster display 721 may customarily display vehicle status, odometer, and/or miles-per-gallon (MPG) measurements, and central information display 722 may customarily display HVAC settings, stereo and song information, and/or navigation maps. In some instances, the vehicle may even permit the driver to customize the default information types provided in each display.

Each display may additionally be configured such that a specific condition triggers a momentary change in the type of information being displayed. As one example, a driver's modification of HVAC settings may cause heads-up display 720 and/or instrument cluster display 721 to momentarily display the modified HVAC settings. As another example, a transition to the next song in an MP3 playlist may cause heads up display 720, instrument cluster display 721, and/or central information display 722 to momentarily display the artist and title of the new current song. It will be appreciated that any condition trigger may be incorporated to produce a momentary change in displayed information in each display, in accordance with a desired operation of the vehicle.

Vehicle bus 700 is further connected to a factory stereo 730. Factory stereo 730 include a display (not shown) that provides pre-established information types and may also provide a momentary change in information type, in the same manner described above with respect to heads up display 720, instrument cluster display 721, and central information display 722.

Factory stereo 730 may communicate with control modules both via direct connections and via vehicle bus 700 to execute functions associated with factory stereo 730. Control modules include the vehicle information processor 710, a factory audio amplifier 740, a satellite radio module 741, a Bluetooth module 742, a navigation module 743, a speech processor module 744, and a central control module 745.

Vehicle information processor 710 provides signals, such as audio signals, to factory stereo 730 over a direct connection 762. Vehicle information processor 710 also communicates with factory stereo 730 via vehicle bus 700 to transmit and/or receive other signals, such as control or status signals.

Factory audio amplifier 740 receives audio signals from factory stereo 730 over a direct connection 764, and amplifies and plays the audio signals through the vehicle's speakers. Direct connection 764 may be an analog connection for transmission of line-level audio signals, or may alternatively be a digital connection such as a dedicated secondary bus for transmission of digitally-encoded audio signals for decoding by factory audio amplifier 740. Factory audio amplifier 740 also receives signals such as control signals (e.g., controlling volume, balance/fade, treble/bass), and sends signals such as status signals, over vehicle bus 700.

Satellite radio module 741 provides access to satellite radio stations for factory stereo 730. Satellite radio module 741 receives and decodes satellite signals corresponding to satellite radio stations from a satellite antenna. Satellite radio module 741 transmits the decoded audio to factory stereo 730 via direct connection 765. Satellite radio module 741 also communicates with factory radio 730 via vehicle bus 700, such as sending status signals (e.g., text information, channel numbers), and receiving control commands from factory stereo 730 in accordance with a desired operation (e.g., changing satellite radio stations).

Bluetooth module 742 provides a Bluetooth interface for factory stereo 730. Bluetooth module 742 receives wireless signals over Bluetooth protocol from a cellular telephone or any other Bluetooth device. Bluetooth module 742 provides audio signals to factory stereo 730 over direct connection 766. Bluetooth module 742 also communicates with factory radio 730 via vehicle bus 700, such as sending data (e.g., caller ID, text messages, status), and receiving control commands to control the Bluetooth device. With the Bluetooth module 742, the factory stereo 730 may provide hands-free telephone calls, streaming Bluetooth audio, display of text messages, Internet access, mobile hotspot, or any other feature available via a Bluetooth connection.

Navigation module 743 provides navigation abilities for factory stereo 730. Navigation module 743 receives location signals such as GPS signals, renders a continuously-updating mapping display, and provides this video map to factory stereo 730 over direct connection 767. Navigation module 743 may also store map and points-of-interest data and incorporate this information in the video map. Navigation module 743 may also provide turn-by-turn audio prompts, and provide this audio to factory stereo 730 over direct connection 767. Navigation module 754 also communicates with factory stereo 730 via vehicle bus 700, such as transmitting additional signals (e.g., supplemental navigation information, status), and receiving signals (e.g., control signals to adjust video map). Factory stereo 730 may also provide navigation information to other vehicle displays such as heads-up display 720, instrument cluster display 721, and central information display 722 via vehicle bus 700.

Speech module 744 provides speech processing abilities for announcements that are played through factory stereo 730. For instance, factory stereo 730 may use speech module 744 to announce navigation prompts, Bluetooth caller ID, song/title information, or any other information. Factory stereo 730 may also receive and process requests from other vehicle components (e.g., vehicle information processor 710) to play announcements as instructed by those vehicle components. In addition, speech module 744 may provide speech-recognition functions. That is, speech module 744 may also receive audio clips of a driver or passenger's speech, and decode the audio clips into voice commands corresponding to a vehicle action. Speech module 744 transmits and/or receives audio from factory stereo 730 via a direct connection 768. Speech module 744 also communicates with factory stereo 730 via vehicle bus 700, such as control and/or status signals. Speech module 744 may communicate with the other vehicle modules over vehicle bus 700 as appropriate, for execution of the desired voice command.

Central control module 745 provides user input for controlling vehicle functions including those on factory stereo 730. Examples of a central control module 745 include a centrally-positioned joystick, wheel, slide, touchpad, button assembly, or any other user input type. Central control module 745 transmits user inputs over vehicle bus 700 to modules such as factory stereo 730.

Vehicle bus 700 is also connected to a backup camera 750 and rear-seat entertainment 751, such as rear-seat video screens and/or headphone jacks. Backup camera 750 provides video signals over direct connection 763 to factory stereo 730 to display when the vehicle is operated in reverse gear. Rear-seat entertainment 751 receives audio and/or video signals from factory stereo 730 via direct connection 769 to provide rear seat occupants with additional audio and/or video entertainment source(s) that play independently from primary audio and/or video selections being played and controlled by the front-seat occupants. Backup camera 750 and rear-seat entertainment 751 additionally communicate with factory stereo 730 via factory bus 700, to transmit and/or receive status and control signals.

Vehicle bus 700 may also be connected to steering wheel controls 760. As already described, steering wheel controls 760 are buttons on the steering wheel of the vehicle that allow a driver to control various functions on factory stereo 730. On some vehicles, steering wheel controls 760 may not be connected to vehicle bus 700, but may instead be connected to factory stereo 730 via a direct connection 761.

Vehicle bus 700 is also connected to an HVAC control module 770 and HVAC controls 771. HVAC controls 771 allow operator adjustments of climate control settings, and such adjustments are transmitted to HVAC control module 770 via signals over vehicle bus 700. HVAC controls 771 may include knobs, buttons, or any other user control interface. HVAC control module 770 controls the heating and cooling systems of the vehicle in accordance with signals received from HVAC controls 771.

It will be appreciated that direct connections 761-769 are traditionally analog connections, but may alternatively be digital connections or secondary data busses, with the appropriate encoders and decoders to perform conversion between digital and analog. It will also be appreciated that while direct connections 761-769 may each constitute a single wire or multiple wires, or may even be a wireless connection. It will further be appreciated that while digital connections 761-769 are described as separate connections for each vehicle module, these connections may be shared connections, such that multiple modules utilize a common connection. It will still be appreciated that the vehicle modules may be alternatively configured to solely utilize vehicle bus 700 for communication, instead of additionally using the corresponding direct connections as described.

A problem arises when factory stereo 730 is replaced with an aftermarket stereo. Upon such a replacement, many of the factory components, as described above with reference to FIG. 7, may be rendered partially crippled or even entirely inoperable. For instance, factory audio amplifier 740, satellite radio module 741, Bluetooth module 742, navigation module 743, speech module 744, central control module 745, backup camera 750, rear seat entertainment 751, and steering wheel controls 760 may not be directly compatible with the aftermarket stereo.

Additionally, heads-up display 720, instrument cluster display 721, and central information display 722 may not continue to display stereo information, as they are not directly compatible with the aftermarket stereo. Furthermore, installation of the aftermarket stereo may require the removal of HVAC controls 771 when such controls are integrally attached to factory stereo 730, so HVAC control module 770 will no longer receive signals for adjusting the climate control.

This problem occurs because conventional aftermarket stereos lack the functionality to interface and communicate with vehicle bus 700, as required to operate the factory modules. The problem is aggravated in that aftermarket stereos are designed to be broadly compatible, while vehicle data busses vary among different vehicle manufacturers and or even within the same manufacturer among different models or model years. Aftermarket stereos are not equipped to be universally compatible with all vehicle bus types. As such, the functionality of factory-installed modules is customarily lost when a factory stereo is replaced with an aftermarket stereo.

As the above discussion makes clear, there is a need to provide a simple, universal solution for providing SWC inputs of all makes and models to aftermarket radios from a wide variety of manufacturers. In particular, an installer can benefit from a device which automatically detects at its input an SWC signal and which configures itself accordingly. Additionally, installers can further benefit from a device which automatically detects an aftermarket component and which further configures itself accordingly. In this manner, the device allows for a simple "plug-and-play" installation process, reducing the stress and risks of installation for both professional and self-installers.

There is also a need to provide a simple, universal solution that retains the functionality of factory-installed components and modules when a factory stereo is replaced with an aftermarket stereo.

SUMMARY OF THE INVENTION

The present invention addresses the challenges in the art discussed above.

According to one aspect of the invention, an input side of an SWC interface can connect to one or more steering components that transmit SWC signals. The connection can be made by hard-wiring the SWC interface to the steering components. In this aspect, the SWC interface can automatically detect each transmitted SWC signal. Automatic detection can include differentiating among multiple SWC signals and determining the meaning (e.g., "volume up," "seek down") of each signal.

According to another aspect of the invention, an input side of an SWC interface can connect to a vehicle bus on which SWC signals are transmitted. The connection can be made by, for example, hard-wiring the SWC interface to the bus or connecting a plug associated with interface into a suitable jack associated with the bus. The bus, which may or may not be factory-installed and factory-configured, can be one that is configured to transmit SWC signals as well as other signals associated with other vehicle components. These other components may or may not be related to audio components, video components, or other entertainment components of the vehicle. In this aspect, the SWC interface can automatically detect SWC signals transmitted on the bus. Automatic detection can include differentiating SWC signals from various signals transmitted on the bus and determining the meaning (e.g., "volume up," "seek down") of each signal.

According to yet another aspect of the invention, an output side of an SWC interface can be connected to an aftermarket component. The connection can be hard-wired or over a bus. Through this connection, the SWC interface can deliver SWC signals to the aftermarket component. Delivery of SWC signals by the SWC interface may include reformatting of the signals by the interface. In this aspect, the SWC interface can automatically detect the aftermarket component. Automatic detection can include determining the particular manufacturer and model number of the component. Automatic detection can further include determining a mode for delivery of SWC signals.

Still another aspect of the invention relates to a method of connecting an aftermarket component with a vehicle using an interface apparatus, the interface apparatus connected via a first connection to a factory data bus of the vehicle which transports signals according to a first data format, the interface apparatus further connected via a second connection to a data channel of the aftermarket component which transports signals according to a second data format, the interface apparatus including at least one processor, the method comprising identifying, via the at least one processor, a factory data bus type corresponding to the factory data bus, out of a plurality of potential factory data bus types; receiving digital signals from the aftermarket component via the second connection, the digital signals being in the second data format, the second data format corresponding to the aftermarket component; translating the digital signals into the first data format, the first data format corresponding to the identified factory bus type; and transmitting the translated digital signals in the first data format to the vehicle via the first connection.

Yet another aspect of the invention relates to an apparatus comprising a vehicle-interface unit electrically connectable to a factory data bus of a vehicle via a first connection, the vehicle-interface unit being adapted to identify a factory data bus type corresponding to the factory data bus, out of a plurality of potential factory data bus types, and transmit and receive digital signals via the first connection according to a first data format corresponding to the identified factory data bus type; an aftermarket-component-interface unit electrically connectable to a data channel of an aftermarket component via a second connection, the aftermarket component-interface unit being adapted to transmit and receive digital signals via the second connection according to a second data format corresponding to the aftermarket component; and a signal processing unit, wherein the signal processing unit is adapted to translate signals of the first data format, received by the vehicle-interface unit via the first connection, into signals of the second data format, and the aftermarket-component-interface unit is adapted to transmit, to the aftermarket component via the second connection, the signals translated by the signal processing unit from the first data format to the second data format, and wherein the signal processing unit is adapted to translate signals of the second data format, received by the aftermarket-component-interface unit via the second connection, into signals of the first data format, and the vehicle-interface unit is adapted to transmit, to a vehicle component via the first connection, the signals translated by the signal processing unit from the second data format to the first data format.

Another aspect of the invention relates to a non-transitory computer-readable storage medium having a program stored thereon for an interface apparatus connected via a first connection to a factory data bus of a vehicle which transports signals according to a first data format, the interface apparatus further connected via a second connection to a data channel of an aftermarket component which transports signals according to a second data format, the program, when executed, causes a processor to perform the steps of identifying a factory data bus type corresponding to the factory data bus, out of a plurality of potential factory data bus types; receiving digital signals from the aftermarket component via the second connection, the digital signals being in the second data format, the second data format corresponding to the aftermarket component; translating the digital signals into the first data format, the first data format corresponding to the identified factory bus type; and transmitting the translated digital signals in the first data format to the vehicle via the first connection.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings. Like reference numbers between two or more drawings can denote identical or functionally similar elements unless the description indicates otherwise.

DETAILED DESCRIPTION OF THE INVENTION

Figure 1:
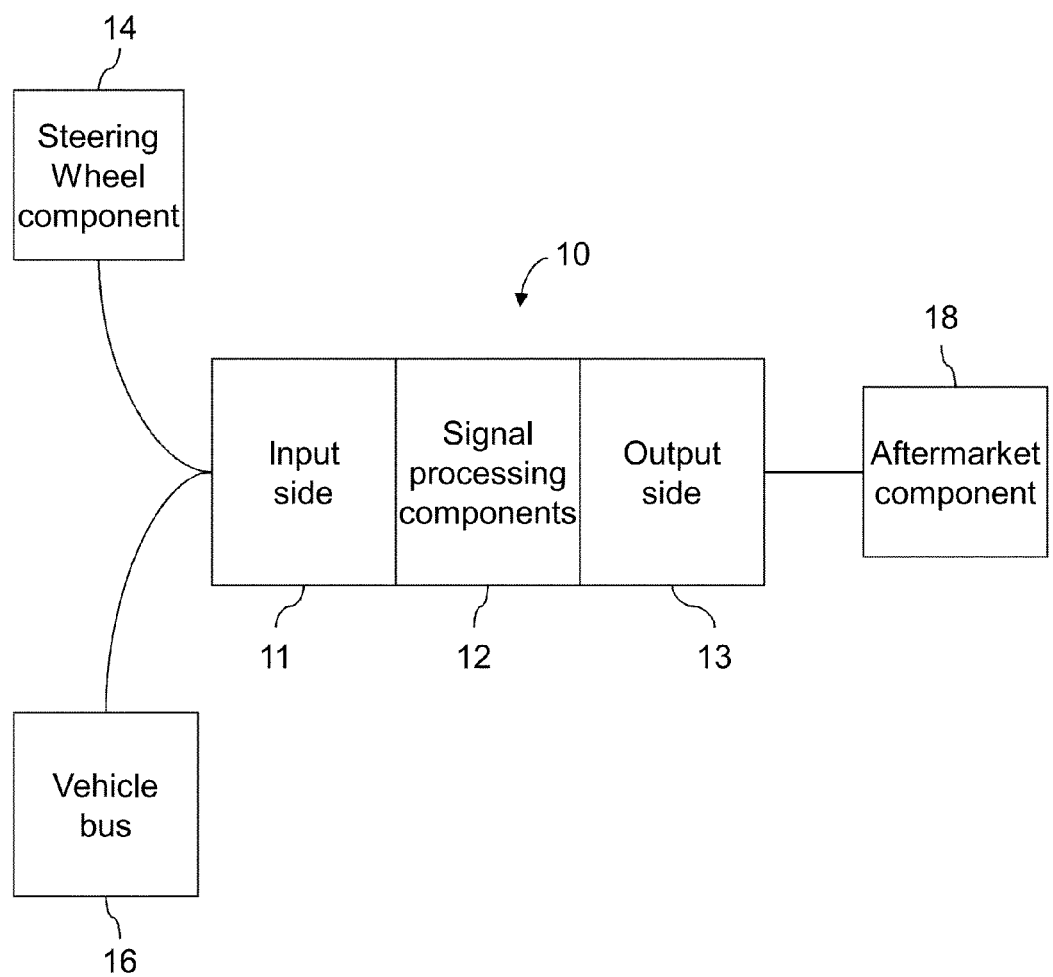
FIG. 1 shows a top-level block diagram of a device suitable for use in various embodiments of the invention.

As described above, various aspects of the invention provide for SWC interfaces that can automatically detect factory-installed and aftermarket components and buses.

Vehicles may transmit signals from a steering wheel to various factory-installed components in various ways. The method of transmission can vary among vehicle makes and models. One common method is a variable resistance method. In this method, the steering wheel component can be, for example, a button provided with an arrangement of switches and resistors. Operation of the button by pressing closes or opens a switch. In turn, this operation changes the resistance on an output line. The output line is wired to a factory-installed component, such as an OEM radio. The variable resistance is fed into the component, which decodes the resistance and translates the change in resistance into the operation of the steering wheel button.

Another common method is to use a data bus. This method, which is common in many modern vehicles, incorporates a data bus architecture to send signals and commands among the various electrical components of a vehicle. Known architectures include J1850, CAN-BUS, and K-BUS. In this method, circuitry is coupled to a steering wheel button. This circuitry transmits digital signal commands along the data bus when the button is pressed. The OEM radio monitors the data bus for the commands. Operation of the radio is controlled according to commands received by the radio over the bus.

As noted above, the transmission of SWC signals from steering wheel components can vary from vehicle to vehicle. An auto-detection method suitable for an individual vehicle thus can depend, broadly speaking, on the method of transmission used in that vehicle, and, more specifically, on the particular electronic configuration of its steering wheel components. Accordingly, one aspect of the invention provides methods for auto-detecting SWC signals among many makes and models of vehicles. These methods will now be described.

In a vehicle where SWC signals are transmitted by a variable resistance method, the SWC signals can be auto-detected by measuring characteristic voltages or other electronic properties associated with that vehicle's SWC components. In many vehicles configured according to a variable resistance method, SWC signals are transmitted on channels configured with a standby resistance. That is, even when no SWC signal is being transmitted on a channel—as may be the case when, for example, the "volume up" steering wheel button is not depressed—a small electrical current nonetheless is drawn by the standby resistance. In these instances, an SWC interface can be configured to measure, for example, a characteristic voltage exhibited by the channel. This voltage can be measured by the SWC interface using, for example, a resistor pulled up to a suitable voltage, such as 5 V or 12 V, depending on the particular SWC configuration of the vehicle, or a resistor pulled down to ground. To measure the characteristic voltage, a resistor pulled up to a suitable voltage may be used when a vehicle's standby resistance is pulled down to ground, while a resistor pulled down to ground may be used when a vehicle's standby resistance is pulled up to a particular voltage.

The following examples illustrate the principle of a characteristic voltage. Consider two hypothetical vehicles, A and B, each having an SWC channel that transmits a "volume up" signal. In vehicle A, the channel operates between 0 V and 5 V and has a standby resistance of 6 kΩ that pulls down to ground. In vehicle B, the channel operates between 0 V and 5 V and has a standby resistance of 24 kΩ that pulls down to ground. If an SWC interface with a pull-up resistance of 1 kΩ is connected to the channel of vehicle A, the voltage in front of the pull-up resistance will be 4.29 V. Thus, 4.29 V is a characteristic voltage of the volume up channel of vehicle A. On the other hand, if an SWC interface with a pull-up resistance of 1 kΩ is connected to the channel of vehicle B, the voltage in front the pull-up resistance will be 4.80 V. Thus, 4.80 V is a characteristic voltage of the volume up channel of vehicle B.

In some embodiments of the invention, the SWC signals of a particular vehicle can be auto-detected based on the characteristic voltage of individual SWC channels. In this aspect of the invention, an SWC interface can be electrically connected to the channels of a vehicle's steering wheel components. Because each SWC channel of a particular vehicle may a characteristic voltage, patterns among the characteristic voltages of the channels can be used by the SWC interface. For example, a particular vehicle manufacturer may configure its vehicles such that each SWC channel has a characteristic voltage of 4.29 V when measured by a pull-up resistance of 1 kΩ. Another manufacturer may configure its vehicles such that each SWC channel has a characteristic voltage 4.80 V when measured by a pull-up resistance of 1 kΩ. Yet another manufacturer may configure its vehicles such that each SWC channel has a characteristic voltage of 1.20 V when measured by a pull-down resistance of 4.7 kΩ. Those having skill in the art will recognize that there are many patterns possible, and that such patterns may vary depending on, for example, a vehicle's make, model, and year. A configuration of an SWC interface suitable for auto-detecting SWC signals transmitted over a variable resistance network is discussed below in connection with FIGS. 2A and 2B.

Although some embodiments directed to auto-detecting a vehicle's variable resistance network may utilize electrical currents drawn by a standby resistance, the invention does not require a standby resistance to be operable. For example, the SWC channels in some vehicles do not have a detectable standby resistance. In this instance, auto-detection may proceed in conjunction with an instruction to an installer to operate one or more SWC components, e.g., the installer may be instructed to press and hold an SWC volume up button for the duration of the detection phase.

Turning now to vehicles where SWC signals are transmitted by a data bus method, SWC signals can be auto-detected by determining a particular vehicle's bus type from among known communication protocols. In vehicles configured with a data bus, data bits are transmitted on the bus at a predetermined frame rate. The frame rate of a particular bus can depend on the communication protocol used by the bus. Thus, different busses may transmit data bits at different frame rates. For example, General Motors' GMLAN bus transmits frames at 33.33 kb/s, while Chrysler's CAN bus transmits frames at 83.33 kb/s. Thus, by determining the transmission rate of a vehicle's bus, the SWC interface also can determine the type of data bus used in the vehicle. Because data bus types among vehicle manufacturers are often highly proprietary, a determination of bus type can be sufficient to allow a designer of an SWC interface to configure the interface to differentiate among signals transmitted on the data bus and to decode individual SWC signals.

In some embodiments of the invention, SWC signals of a particular vehicle can be auto-detected based on a determination of a communication protocol of the vehicle data bus. In these embodiments, an SWC interface can be electrically connected to the data bus by, for example, a jack, a plug, or manual connection of electrical wires. In some vehicles, connecting an SWC interface and providing electrical power to the vehicle can be sufficient to allow the SWC interface to auto-detect SWC signals. This is because some vehicles transmit SWC data frames even when no steering wheel component is being operated, e.g., when no button is depressed. Thus, there are embodiments in which an SWC interface can determine the frame rate of the vehicle's data bus without any manual operation of a steering wheel component. In other vehicles, however, a steering wheel component may need to be operated in order to have data frames transmitted on the bus and to allow for a determination of the frame rate. Auto-detection of SWC signals in these vehicles may require manual operation of one or more steering wheel components. For example, an installer may need to press a steering wheel button at one-second intervals during an auto-detection process performed by the SWC interface. A configuration of an example SWC interface suitable for auto-detecting SWC signals transmitted on a vehicle bus is discussed below in connection with FIG. 2C.

There are some embodiments of the invention in which an SWC interface is electrically connected to variable resistance network, and there are other embodiments in which an SWC interface is electrically connected to a vehicle data bus. However, the invention is not limited to one electrical connection or the other; in some embodiments an SWC interface can connect both to a vehicle's variable resistance network and to the vehicle's data bus. In these embodiments, an auto-detection process can proceed according to information gained from both connections, as will be recognized by those having skill in the art. For example, although a connection to a variable resistance network may yield characteristic voltages of that network, this information may not be sufficient to auto-detect the vehicle's SWC signals. That is, any pattern identified in the characteristic voltages may not be sufficiently unique to configure an SWC interface. However, a connection to the vehicle bus can allow an SWC interface to determine other information besides a data frame rate, such as the vehicle's unique vehicle identification number (VIN). This information obtained from the data bus, together with the pattern of characteristic voltages, may be sufficient to allow the SWC interface to auto-detect SWC signals. Thus, the auto-detection process can be performed using both connections, where one connection or the other may not have been sufficient.

FIG. 1 shows a top-level block diagram of an SWC interface according to an embodiment of the invention. SWC interface 10 includes an input side 11 and an output side 13. Input side 11 can include one or more components configured to auto-detect SWC signals that are transmitted from a steering wheel component 14 or on a vehicle bus 16. Specific features of input side 11 are discussed below in connection with FIGS. 2A-C. Output side 13 includes one or more components configured to auto-detect aftermarket component 18 and further configured to deliver SWC signals to aftermarket component 18. Specific features of output side 13 are discussed below in connection with FIG. 3. SWC interface 10 further can include signal processing components 12, which can process SWC signals received at input side 11 prior to outputting the signals at output side 13. In various embodiments of the invention, processing of SWC signals by signal processing components 12 can depend upon auto-detections performed at input side 11 and output side 13.

The manner in which SWC signals are auto-detected can depend on the configuration of interface 10. For example, if interface 10 is configured to auto-detect signals transmitted from a steering wheel component—as may be the case when a vehicle transmits SWC signals using a variable resistance method—input side 11 can include a wiring harness (not shown), through which interface 10 can be hard-wired to steering wheel component 14. As another example, if interface 10 is configured to auto-detect signals transmitted on a vehicle bus—as may be the case when a vehicle transmits SWC signals on a bus—input side 11 can include a plug which connects to a jack associated with vehicle bus 16.

Figure 2A:
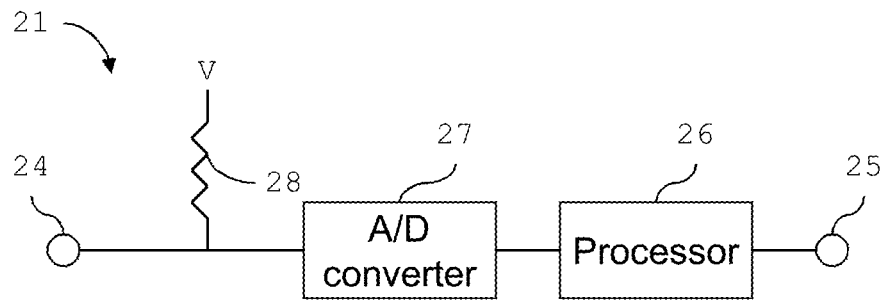
FIG. 2A shows a top-level block diagram of an example circuit according to one aspect of the invention.
Figure 2B:
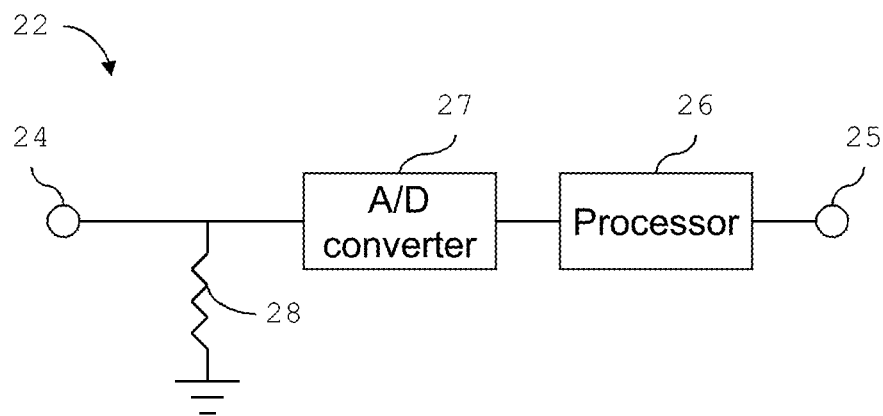
FIG. 2B shows a top-level block diagram of another example circuit according to the same aspect of the invention as illustrated in FIG. 2A.
Figure 2C:
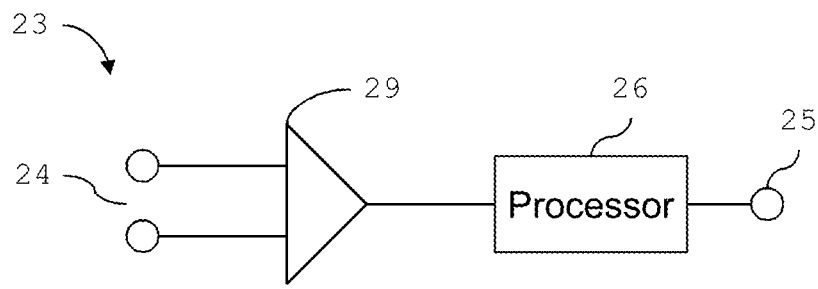
FIG. 2C shows a top-level block diagram of an example circuit according to another aspect of the invention.

FIGS. 2A-C show top-level block diagrams of example circuits capable of auto-detecting SWC signals. In some embodiments of the invention, these circuits may be used individually, while in other embodiments they may be used in combination. As noted above, these circuits can comprise an auto-detecting input side of the SWC interface shown in FIG. 1.

FIGS. 2A and 2B each illustrate a circuit suitable for auto-detecting SWC signals in a vehicle that transmits SWC signals using a variable resistance method. Circuit 21 is one that determines a characteristic voltage of an SWC channel through the use of a pull-up resistor. This circuit can be suitable for use where the standby resistance of a channel pulls the channel to ground. Circuit 21 includes input port 24, output port 25, processor 26, analog-to-digital (A/D) converter 27, and resistance 28. Input port 24 provides an electrical connection to one or more SWC channels. Within the circuit, input port connects to resistance 28. Resistance 28 can be comprised of a single resistor, a variable resistor, or any suitable circuit element that allows for a voltage on the SWC channel to be measured. Resistance 28 pulls the output of the channel up to a voltage V, which can be determined according to design considerations and which may be variable. By virtue of resistance 28, the voltage at the input port 24 is a characteristic voltage of the SWC channel. This voltage is passed through A/D converter 27 and read by processor 26. As previously discussed, because the wiring schematics of steering wheel components can vary among makes and models, different vehicles can have different correlations of their characteristic voltages. Thus, processor 26 can include a recognition module, which can determine the particular configuration of the vehicle from among known configurations. These known configurations, which can be preprogrammed into the recognition module, allow the processor to recognize the resistance network of the steering wheel control circuit particular to the vehicle. In this manner, the variable resistances can be auto-detected and decoded for further processing and transmission an SWC interface. The output of processor 26, which can include characteristic voltage readings, resistance determinations, and information relating to a recognized resistance network, is passed to output port 25, which can be connected to other elements of an SWC interface.

Circuit 22 is similar to circuit 21 except that circuit 22 can be suitable for use where the standby resistance of an SWC channel pulls the channel up to a particular voltage, e.g., 5 V or 12 V. Circuit 22 can be comprised of the same elements as circuit 21 but in a slightly different configuration: circuit 22 differs from circuit 21 in that resistance 28 pulls the output of the channel down to ground. As in circuit 21, the resistance 28 causes the voltage at the input port 25 to be a characteristic voltage of the SWC channel. The other elements of circuit 22 can perform functions similar to those of circuit 21.

With regard to the circuits illustrated in FIGS. 2A and 2B, those having ordinary skill in the art will recognize that many other circuit designs may be suitable for detecting a characteristic voltage of an SWC channel. Although these figures illustrate circuits having both analog and digital elements, suitable circuits may be wholly digital or analog, and may incorporate other elements not discussed herein. Moreover, when comprising an input side of an SWC interface, there may be many such circuits employed. For example, if a vehicle transmits SWC signals over multiple channels, there may be that same number of individual circuits included in the SWC interface, with one circuit corresponding to each channel. Alternatively, there may be only one circuit used, with the circuit configured to measure a characteristic voltage of each channel. The invention is sufficiently flexible that those having skill in the art will be able to adapt it to any particular designs or applications.

FIG. 2C illustrates a bus-monitoring circuit 23, which can be suitable for auto-detecting SWC signals in a vehicle that transmits SWC signals on a bus. Circuit 23 includes input port 24, output port 25, processor 26, and line receiver 29. Input port 24 provides an electrical connection to the vehicle bus. Within the circuit, input port 24 connects to line receiver 29, which converts vehicle bus signals into logic level signals that are suitable for analysis by processor 26. Output from line receiver 29 is passed to processor 26. Processor 26 of circuit 23 can be configured to perform determinations different from the processors in circuits 21 and 22. Specifically, based upon the output from line receiver 29, processor 26 can auto-detect the bus data rate and the vehicle bus type. Processor 26 further can include hardware, software, or a combination thereof to detect commands present on the bus and decode those commands that relate to SWC signals. In this manner, SWC signals transmitted on the data bus can be auto-detected and decoded by the bus-monitoring circuit 23. The output of processor 26, which can include data relating to any of the information detected, decoded, or determined by it, is passed to output port 25, which can be connected to other elements of an SWC interface.

Line receiver 29 may be configured in various ways depending on the configuration of the vehicle bus. For example, data on a vehicle bus may transmitted by single-ended signals or by differential signals. Accordingly, line receiver 29 may be capable of receiving one or more types of signals. As another example, electrical signals on the vehicle bus may vary in amplitude; signal swing on one vehicle bus may be 100 mV, while on another vehicle bus signal swing may be 12 V. Line receiver 29 thus can be capable of converting various signal amplitudes to signals compatible with logic levels of processor 26. For example, line receiver 29 may output to processor 26 a 0 V to 5 V electrical signal.

One aspect of the invention is that an input side of an SWC interface can connect to vehicle components that transmit SWC signals. Embodiments of the invention according to this aspect have been described above. Another aspect of the invention is that an output side of an SWC interface can connect to an aftermarket component and auto-detect that component. In still another aspect of the invention, an SWC interface can deliver SWC signals to an aftermarket component. Embodiments according to these aspects will now be described.

Referring back to FIG. 1, the output side 13 of SWC interface 10 can be coupled to aftermarket component 18 via, for example, a wired connection. Most aftermarket components include a wired remote control input port at the rear of the component. That input port can accept command inputs from a wired remote control that is either bundled with the component or sold as an accessory. However, each manufacturer of aftermarket component uses different techniques to convey remote control signals. Thus, prior to SWC interface 10 providing SWC signals to aftermarket component 18, it may be necessary to determine the manufacturer or model of component 18 in order to provide SWC signals in a format recognizable by component 18.

Some aftermarket components utilize a variable resistance method that is similar to the variable resistance method for conveying SWC signals from a steering wheel component. In this method, a remote control that is electrically coupled to the input port contains a baseline resistance or voltage detectable even when the remote control is not being operated, e.g., when none of its buttons is depressed. Each button on the remote control corresponds to a unique change in resistance or voltage in the wired connection from the remote control to the aftermarket component input port.

Other aftermarket components utilize a digital waveform method that is similar to the use of light-emission waveforms for transmitting IR signals from a wireless remote control, except that the waveforms are transmitted over a wired connection. Each button on the remote control is associated with a unique modulation sequence. When a button is depressed, a pulsed electrical signal generated according to the associated sequence is transmitted from the remote control to the aftermarket component input port.

Output side 13 can perform an auto-detection of aftermarket component 18 by analyzing the electrical characteristics of its input port. In typical aftermarket components, the input port is pulled up to a particular internal supply voltage Vcc by a particular resistance. As with the variable resistance methods for factory steering wheel components, however, there are other input port configurations. For example, some manufacturers may design their components such that their remote control input ports are pulled down to ground. The invention is sufficiently flexible that output side 13 can accommodate for variations in input port electrical characteristics.

One method for analyzing the electrical characteristics of an aftermarket component is to measure the open circuit voltage and the load voltage of the input port. Output side 13 can be configured to make these measurements. When measuring the load voltage, output side can be configured to draw a known current, such as 100 μA. Based upon the two voltages and the known current drawn, the pull-up or pull-down resistance of the input port can be determined. Using these electrical values, output side 13 (or a component to which it can communicate, such as signal processing components 12) can access a predetermined lookup table which correlates the electrical characteristics of component 18 to a particular manufacturer and/or model. In this manner, output side 13 can determine the particular manufacturer and/or model of the aftermarket component 18, and SWC interface 10 can associate itself with a set of electrical output signals that are correlated to respective remote control commands recognized by component 18. Accordingly, when the output side 13 receives a control command from input side 11 or signal processing components 12 indicating input from steering wheel component 14 or vehicle bus 16, the output side 13 can transmit an appropriate electrical signal to aftermarket component 18.

Figure 3:
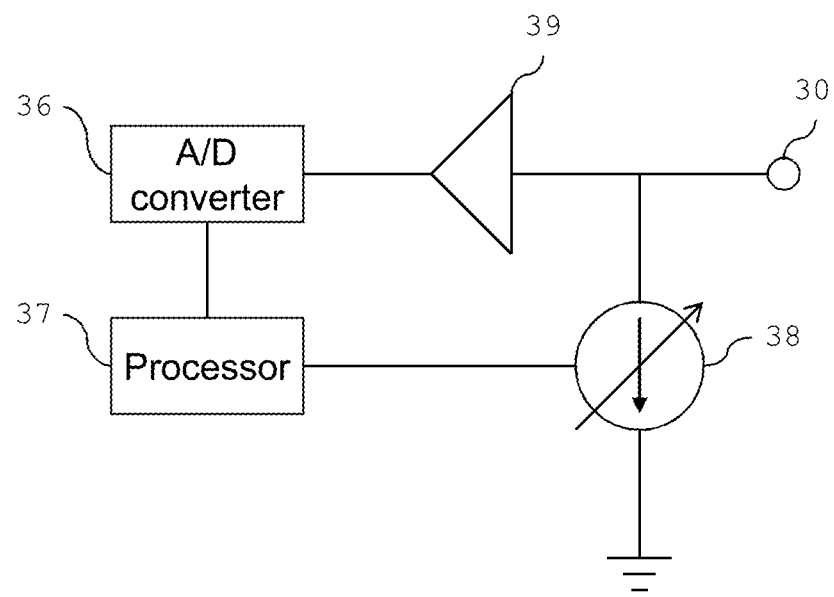
FIG. 3 shows a top-level block diagram of an example circuit according to still another aspect of the invention.

FIG. 3 shows a top-level block diagram of an example circuit capable of analyzing the input port of an aftermarket component. This circuit can comprise an auto-detecting output side of the SWC interface of FIG. 1. The circuit includes port 30, A/D converter 36, processor 37, current source 38, and buffer 39. Port 30 can be electrically coupled to the input port of the aftermarket component. Current source 38 can be varied by processor 37 depending on whether a measurement of the open circuit voltage or the load voltage is desired. Processor 37 further can vary resistance 38 to control the current drawn through port 30. Analog voltages from the input port pass through buffer 39 and A/D converter 36 prior to reading by processor 37. Processor 37 can read and calculate the electrical characteristics of the input port. These characteristics can be sent to other components of an SWC interface, such as signal processing components 12.

In various embodiments if the invention, an output side of an SWC interface can transmit SWC signals to an aftermarket component following auto-detection of the component. Although transmission of SWC signals can proceed according to any suitable method, in one embodiment of the invention, an output side of an SWC interface is configured to transmit both variable resistance signals and digital waveform signals, depending on the auto-detection of an aftermarket component. Referring to the SWC interface of FIG. 1, in this embodiment output side 13 can include a variable resistance circuit and a digital waveform emission circuit.

A variable resistance circuit can include a regulated current sink that is driven by a pulse width modulated (PWM) output, an output operational amplifier, and a bipolar junction transistor. The PWM output is coupled to an input of the amplifier, and the output of the amplifier is coupled to the base of the bipolar junction transistor. By increasing or decreasing the duty cycle of the PWM, the DC voltage at the input of the amplifier is increased or decreased, respectively. Consequently, the amplifier output voltage (and base of the bipolar junction transistor) increases or decreases, which increases or decreases a current at the collector of the bipolar junction transistor. This current is drawn at the aftermarket component wired input port by, for example, a pull-down resistor. An increasing current through the pull-down resistor may be interpreted by the aftermarket component as a remote control command according to its predetermined configuration. While other methods of reproducing a variable resistance are possible, and may be interchangeable with the method of the circuit just described, the use of a variable PWM signal can allow for flexibility in variable resistance values.

For transmission of digital waveforms, a digital waveform emission circuit can generate a modulated signal pattern replicating a known pattern corresponding to a particular remote control command for the particular manufacturer of the aftermarket component. The circuit then can transmit the signal pattern via the wired link to the aftermarket component using any one of a variety of known modulated signal transmission techniques.

Figure 4:
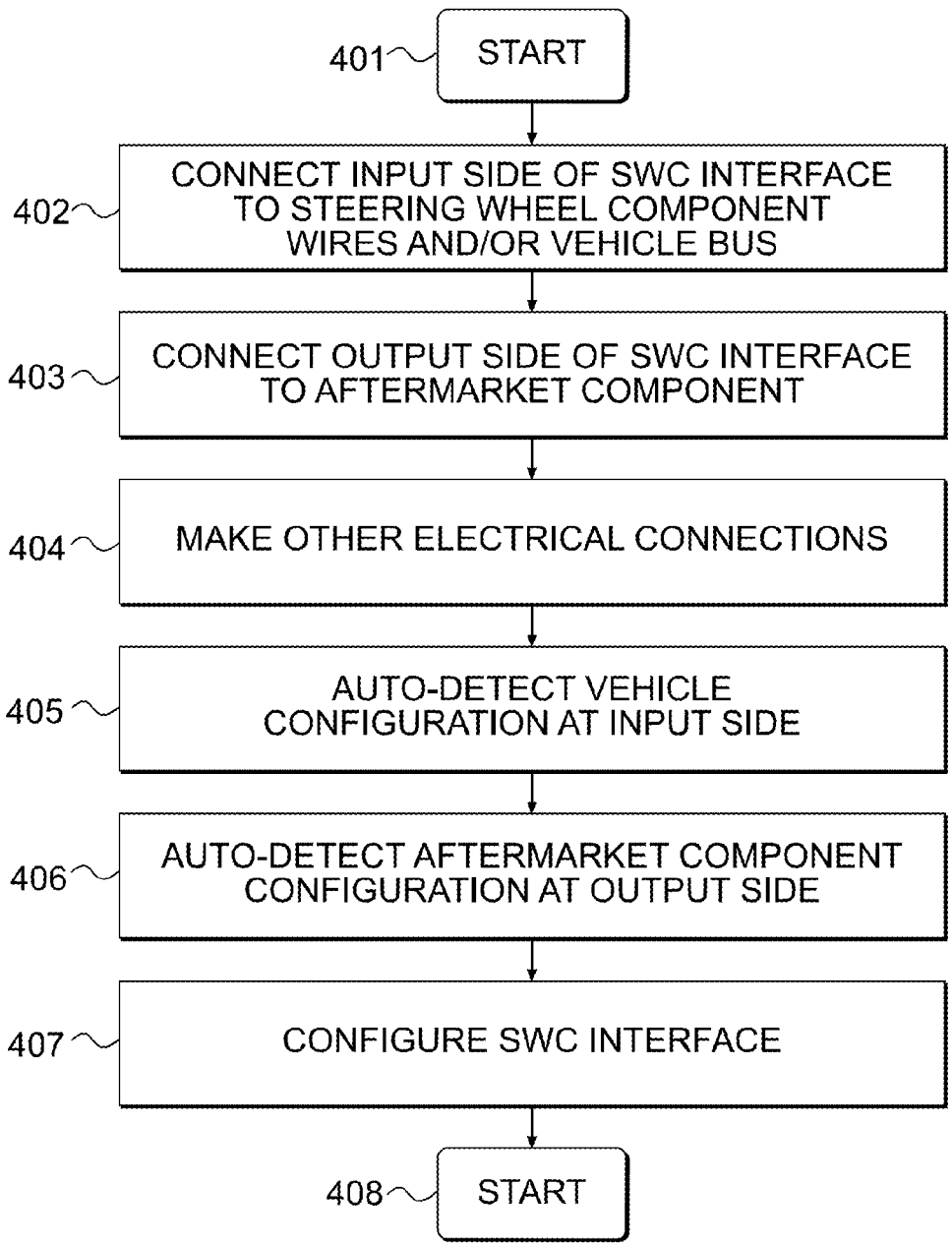
FIG. 4 illustrates a method of installing and configuring a device according to various embodiments of the invention.

FIG. 4 illustrates an example method of installing and configuring a device such as the SWC interface of FIG. 1. The method begins at step 401. Prior to this step, an aftermarket component, which may be replacing a factory-installed component, has been installed in a vehicle, and any typical connections, such as power, video, or audio connections, may have been made. At step 402, an input side of the SWC interface is electrically connected to the vehicle. Depending on the particular vehicle in which the SWC interface is being installed, this step may include connecting the SWC interface to one or more steering wheel component wires and connecting the interface to the vehicle's data bus. Step 402 may require splicing or cutting factory-installed wires and may involve proprietary electrical connectors. At step 403, an output side of the SWC interface is electrically connected to the aftermarket component. In some instances, the connection may be made simply by plugging into a jack provided in the aftermarket component. However, in other instances step 403 may require wiring similar to step 402. At step 404, other electrical connections are made. These connections may be required for the SWC operate or function properly and may include, for example, connecting a power wire to the SWC interface, connecting an accessory power wire from the aftermarket component to the SWC interface, or connecting a ground wire from a steering wheel component to the aftermarket component. At step 405, the vehicle configuration is auto-detected at the input side of the SWC interface, and at step 406, the aftermarket component configuration is auto-detected at the output side of the SWC interface. Detection at step 405 can include auto-detection of a variable resistance network of steering wheel components or auto-detection of a vehicle data bus, as previously described. Detection at step 406 can include auto-detection at an input port of the aftermarket component. As discussed below in connection with FIGS. 5 and 6, if an auto-detecting step is unable to sufficiently identify a configuration of the vehicle or the aftermarket component, the SWC interface can prompt a user to configure the SWC interface manually. Based on the auto-detection at steps 405 and 406 (and any corresponding manual configuration), at step 407 the SWC interface can internally configure itself to transmit SWC signals to the aftermarket component. The method terminates at step 408.

Figure 5:
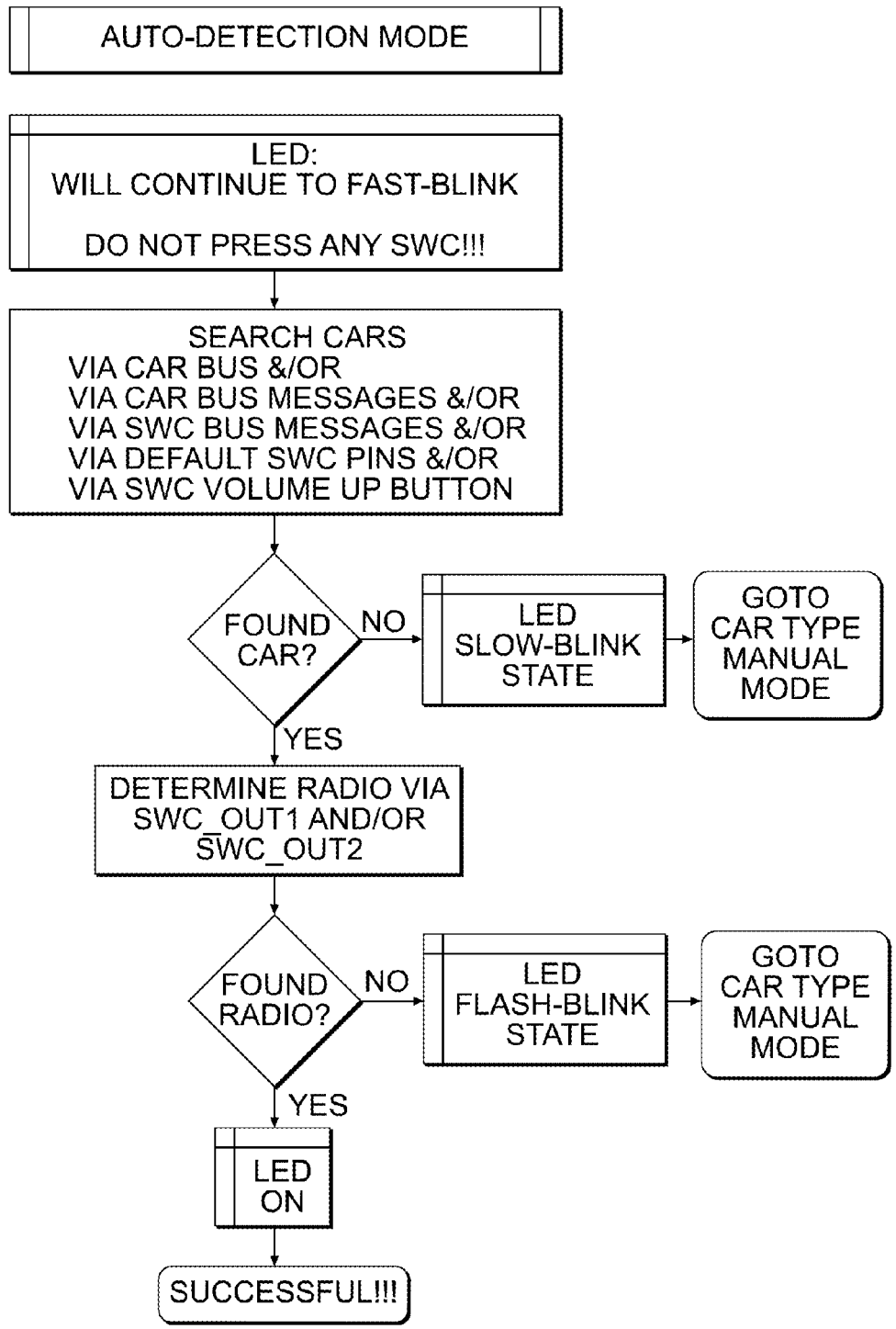
FIG. 5 shows a method of auto-detecting a vehicle configuration and an aftermarket component according to an embodiment of the invention.

A set of steps that may comprise steps 405 and 406 is shown in FIG. 5. As shown in this figure, an LED or other indicator on the SWC interface can inform a user that auto-detection is in process. When auto-detecting the vehicle configuration, as would be the case in step 405, the SWC interface can search for pertinent data or electrical information via several ways, including the vehicle bus and steering wheel components. If the vehicle is sufficiently identified by that data or information, the SWC interface can proceed to auto-detect the aftermarket component configuration. However, if the vehicle configuration cannot be sufficiently identified, a user can be prompted to manually configure the SWC interface with the vehicle information, as discussed below in connection with FIG. 6A. After the SWC interface has determined the vehicle configuration (whether by auto-detection or manual entry), the interface can auto-detect the aftermarket component configuration according to step 406. If the aftermarket component configuration cannot be sufficiently identified by auto-detection, a user can be prompted to manually configure the SWC interface with the aftermarket configuration, as discussed below in connection with FIG. 6B. After the SWC interface has determined the aftermarket configuration (whether by auto-detection or by manual entry), the SWC interface can proceed to indicate that detection is successful (and, in the method of FIG. 4, proceed to step 407).

Figure 6A:
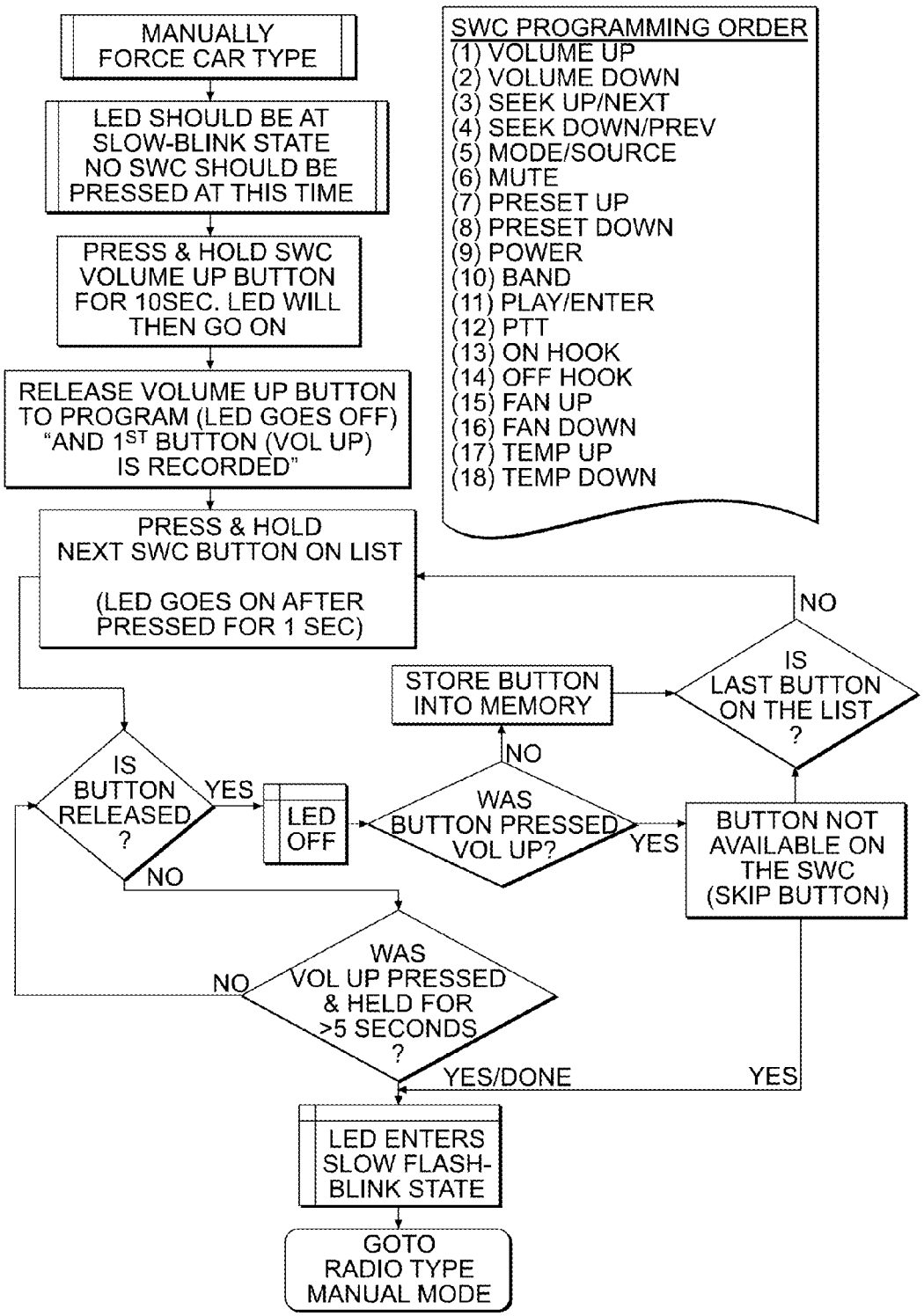
FIG. 6A shows a method of manually configuring an SWC interface.
Figure 6B:
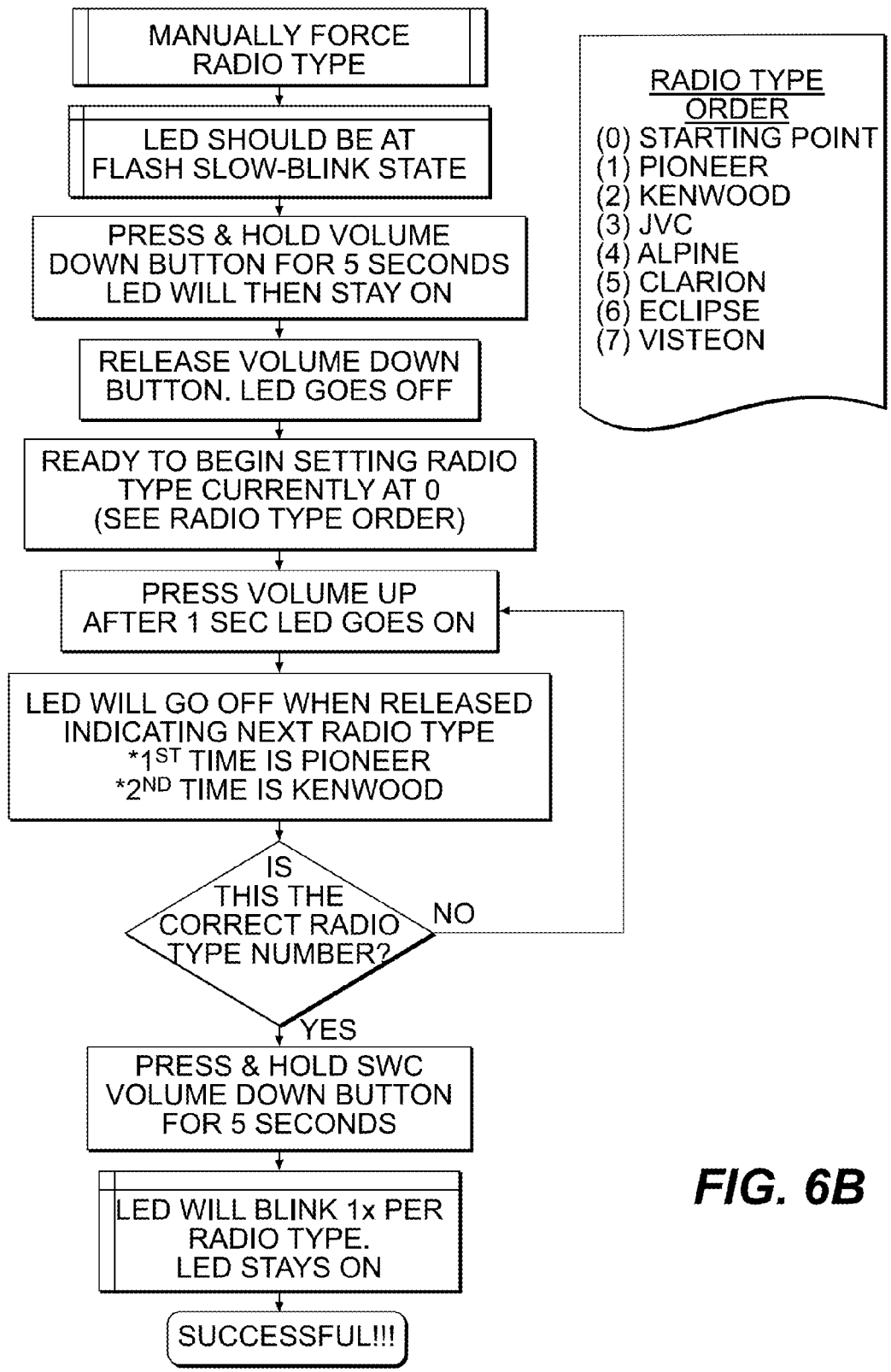
FIG. 6B shows another method of manually configuring an SWC interface.

FIGS. 6A and 6B show example methods for manually configuring an SWC interface with a vehicle configuration and an aftermarket component configuration, respectively. As shown in these figures, manual configuration can be accomplished through operation of steering wheel control components. Such operation can both program the SWC interface to recognize SWC signals and be used for entry of information. During manual configuration, the SWC interface can provide feedback to the user by, for example, visual indicators such as LEDs.

An SWC interface can be manually configured in ways other than those shown in FIGS. 6A and 6B. In some embodiments of the invention, a manual configuration routine can be used to alter the assignment or function of steering wheel control components. For example, an installer can swap a "seek up" button with a "volume up" button or change a "source" button to a "preset" button. Furthermore, such a reassignment or remapping of functions can be performed by any user of the SWC interface—e.g., an installer, a vehicle owner, or a later purchaser of the vehicle—anytime after installation and configuration of the SWC interface. Unlike devices similar to those discussed in the Background of the Invention, some embodiments of the invention can be remapped using only SWC signals generated by SWC components. That is, user input from SWC components, e.g., steering wheel buttons, can be sufficient to remap an SWC interface; no physical interaction with the installed SWC interface may be required.

The description thus far has related primarily to receiving steering wheel control signals to control an aftermarket stereo. However, it will be appreciated that the invention is also applicable towards other applications, including as follows.

Figure 7:
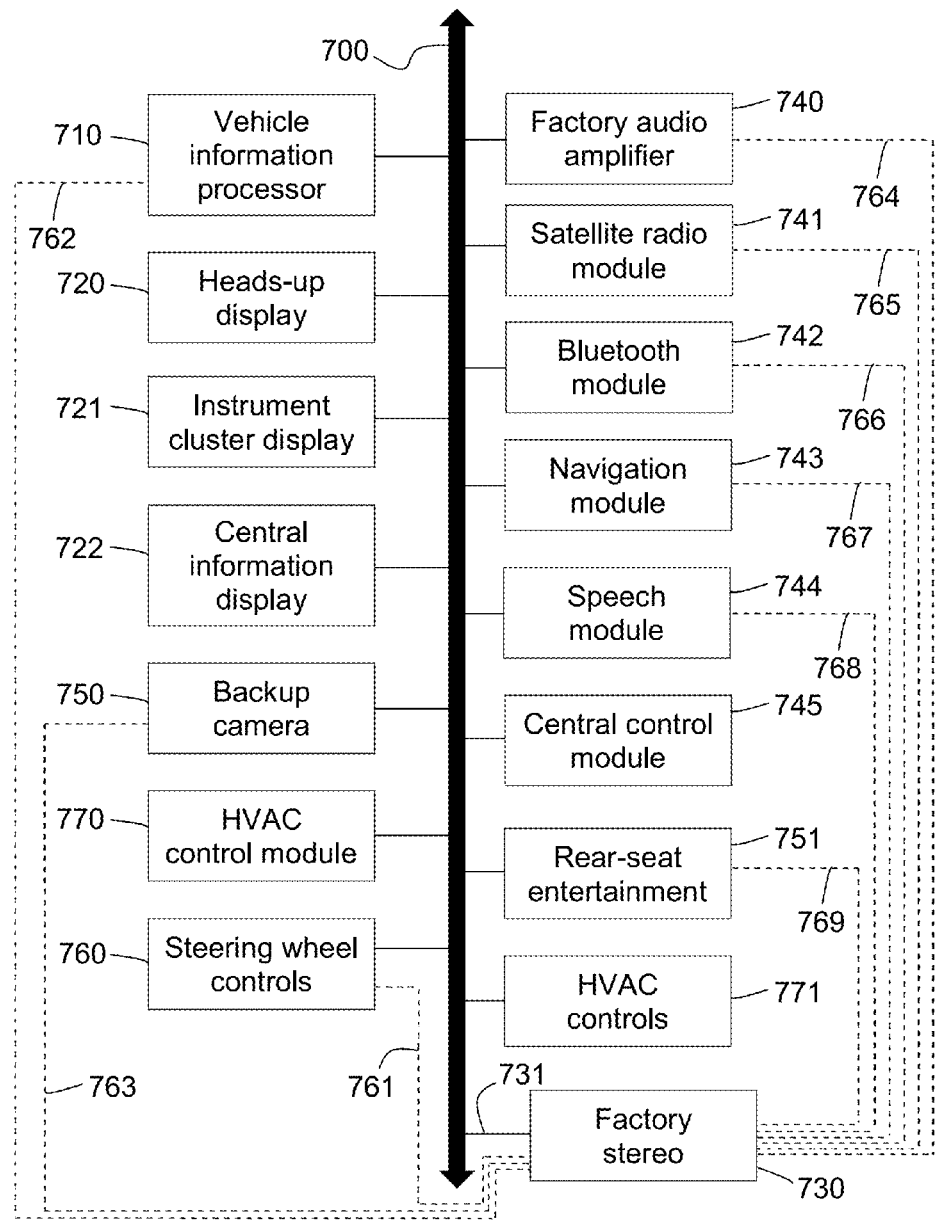
FIG. 7 shows a system diagram of a vehicle data bus and factory vehicle components connected thereto, in a conventional vehicle.
Figure 8:
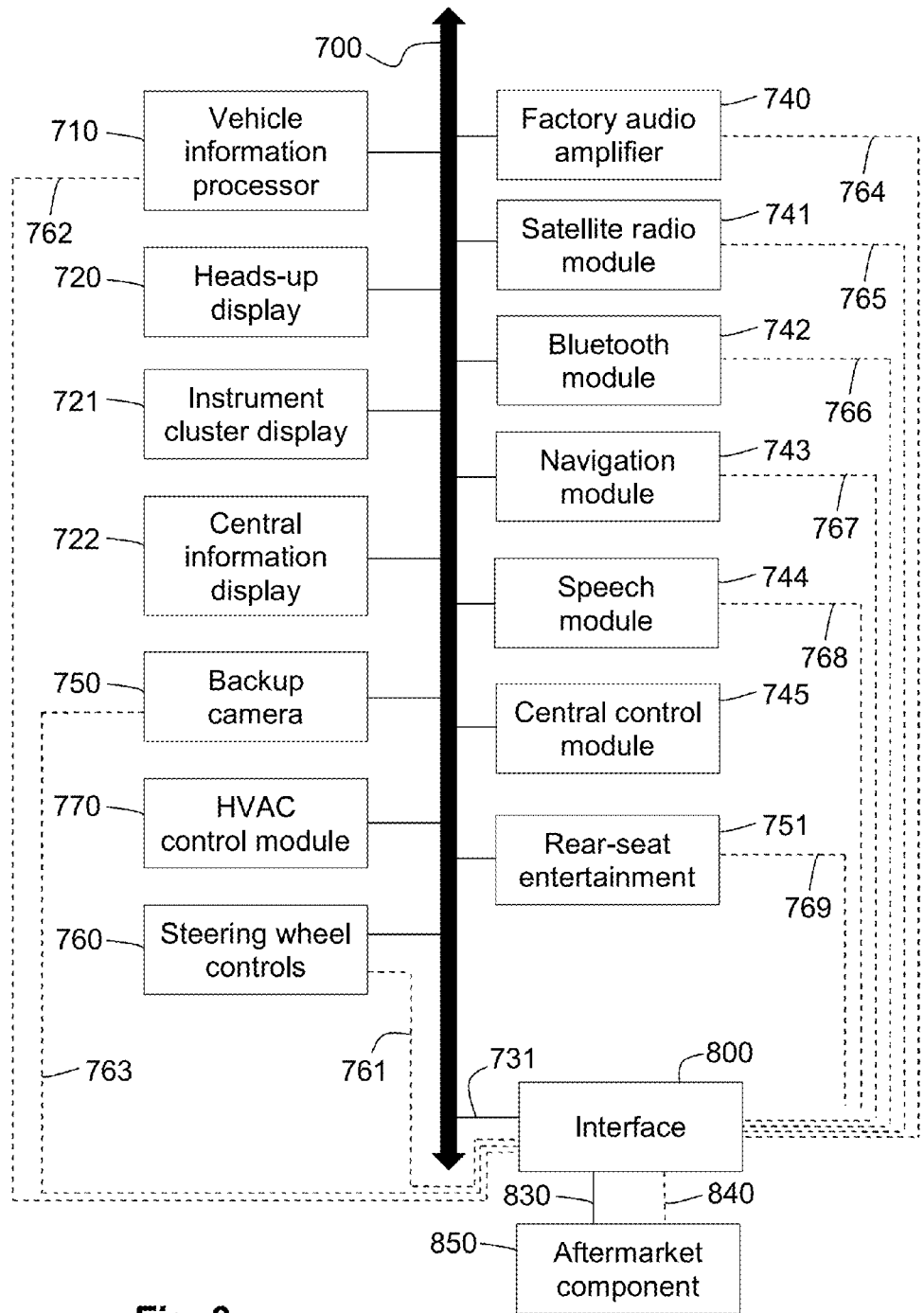
FIG. 8 shows a system diagram of a vehicle data bus, and factory components and an interface connected thereto, in accordance with a second embodiment of the invention.

FIG. 8 shows a system diagram of a device in accordance with a second embodiment of the invention, connected to a vehicle data bus. As seen in FIG. 8, interface 800 is connected to vehicle bus 700 via connection 731. Connection 731 was previously connected to factory stereo 730 (depicted in FIG. 7) prior to factory stereo 730 being removed to install an aftermarket component. Interface 800 reuses the existing connection 731 to connect itself to vehicle bus 700. It will be appreciated that interface 800 may alternatively connect to vehicle bus 700 via another access port other than existing connection 731, or even via wireless or other formats.

As already mentioned with respect to FIG. 7, on some vehicles, the steering wheel controls 760 are directly connected to factory stereo 730 via direct connection 761. In such an instance, the direct connection 761 is re-used to connect the steering wheel controls 760 to interface 800.

Interface 800 is also connected to direct connections 762-769 that were previously connected to factory stereo 730.

Interface 800 is further connected to an aftermarket component 850 via connection 830. Aftermarket component 850 may be an aftermarket stereo that has replaced factory stereo 730 as depicted in FIG. 7. Alternatively, aftermarket component 850 may be an additional component for providing additional entertainment or other functions for vehicle, if factory stereo 730 is retained. As one example, aftermarket component 850 may provide aftermarket rear-seat entertainment features if the vehicle did not include such features from the factory.

Interface 800 may also be connected to aftermarket component 850 via a second connection 840. For instance, the second connection 840 may be dedicated for a specific signal type, such as steering wheel controls. Providing the second connection 840 allows the interface 800 to be universally compatible with different brands and models of aftermarket components, such as those that receive steering wheel controls only via the second connection 840. It will be appreciated that that interface 800 may provide steering wheel control signals through either one of connection 830 or second connection 840, regardless of whether steering wheel controls are received via vehicle bus 700 or connection 761, in accordance with a desired operation of interface 800.

As seen in FIG. 8 and previously discussed, the installation of aftermarket component 850 to replace the factory stereo 730 may require the removal of HVAC controls 771. Accordingly, HVAC controls 771 are absent from the diagram of FIG. 8.

Figure 9:
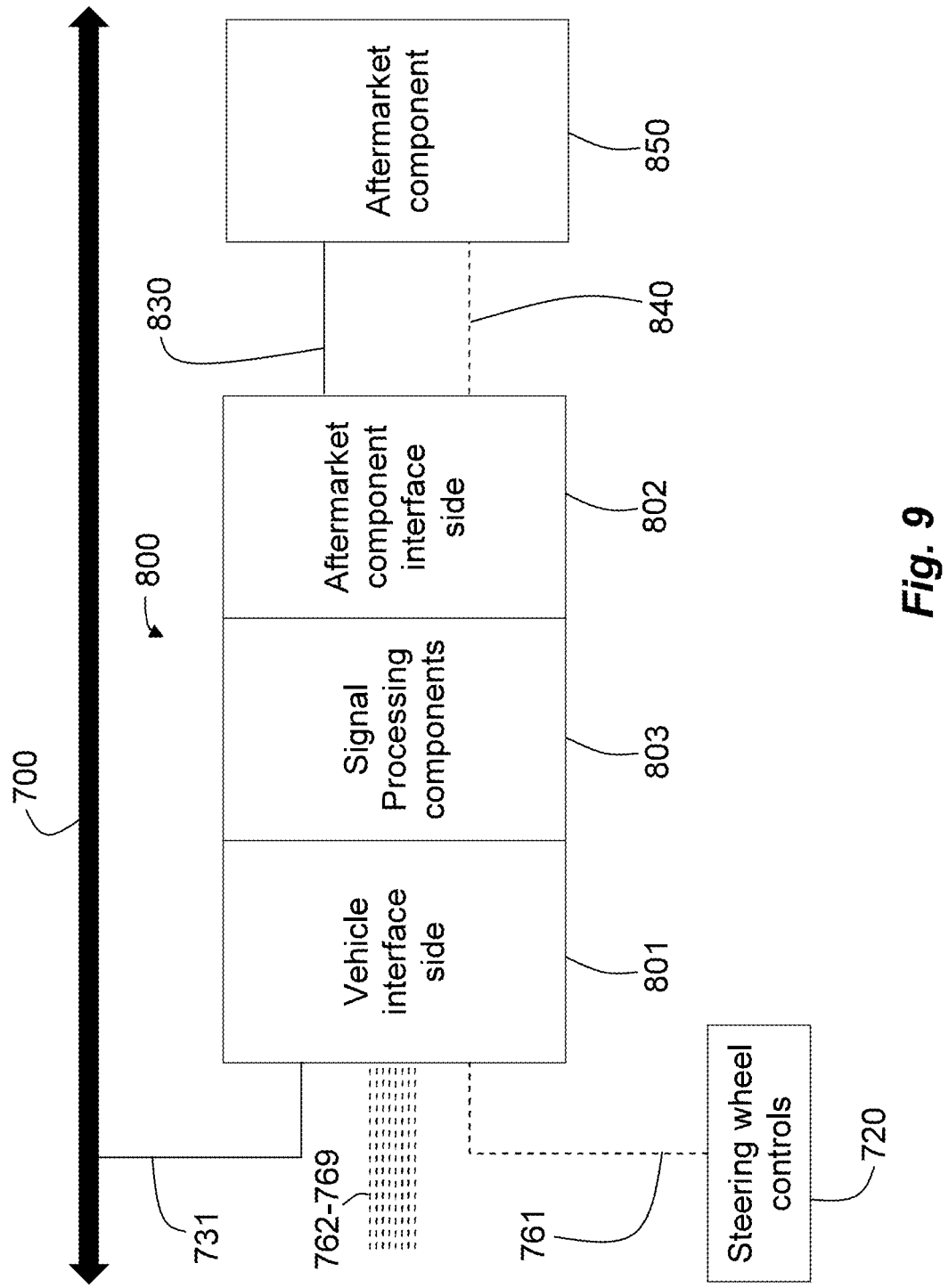
FIG. 9 shows a top-level diagram of the interface in accordance with the second embodiment of the invention.

FIG. 9 shows a top-level layout of interface 800. Interface 800 includes a vehicle interface side 801, aftermarket component interface side 802, and signal processing components 802.

Vehicle interface side 801 shares some features in common with the input side 11 described in the interface of FIG. 1. That is, vehicle interface side 801 connects interface 800 to vehicle bus 700 via connection 731. Vehicle interface side 801 may include one or more components configured to auto-detect vehicle bus 700, including the vehicle bus type, in accordance with the description provided above with respect to FIGS. 2C and 4-6.

Vehicle interface side 801 may also connect interface 800 to steering wheel controls 760 via connection 761. Vehicle interface side 801 may include one or more components configured to auto-detect steering wheel controls 760, in accordance with the description provided above with respect to FIGS. 2A, 2B, and 4-6.

Vehicle interface side 801 is also connected to vehicle information processor 710, backup camera 750, factory audio amplifier 740, satellite radio module 741, Bluetooth module 742, navigation module 743, speech module 744, and rear-seat entertainment 751 via corresponding direct connections 762-769.

However, vehicle interface side 801 differs from input side 11 in at least one significant aspect. In addition to receiving bus signals from vehicle bus 700, vehicle interface side 801 is adapted to also transmit bus signals onto vehicle bus 700. That is, by transmitting bus signals using vehicle interface side 801, bidirectional (two-way) communication is achieved over vehicle bus 700 between interface 800 and vehicle components such as those illustrated in FIG. 8. The signals transmitted by vehicle interface side 801 include signals provided by signal processing components 803.

Aftermarket component interface side 802 shares some features in common with the output side 13 described in the interface of FIG. 1. That is, aftermarket component interface side 802 connects interface 800 to aftermarket component 850 via connections 830 and/or 840. However, aftermarket component interface side 802 differs in several aspects.

First, while connection 840 that connects aftermarket component interface side 802 may comprise a typical 3.5 mm jack or single-lead wire that is common in many aftermarket components for receiving steering wheel control signal inputs, connection 830 is a bidirectional data connection between aftermarket component interface side 802 and aftermarket component 850.

Connection 830 is preferably a digital connection, and more preferably a USB connection. That is, aftermarket component interface side 802 and aftermarket component 850 preferably each include a USB port, and a USB cable is provided to connect the two ports. The USB port on aftermarket component 850 may be a USB port reserved for communicating with vehicle interfaces such as interface 800, or may be a universal USB port intended to connect any USB component (e.g., MP3 players, USB drives). The USB port on aftermarket component 850 may also be adapted to receive a USB hub for expanding the quantity of available USB ports. It will be appreciated that connection 830 may alternatively be any other form of connection, including wireless (e.g., WiFi, Bluetooth) or any other format.

Aftermarket component interface side 802 is adapted to receive signals from aftermarket component 850 over connection 830, as will be later discussed. Aftermarket component interface side 802 provides these signals to signal processing components 803.

Aftermarket component interface side 802 is further adapted to receive signals from signal processing components 803, and provide these signals to aftermarket component 850 over connection 830, as will be later discussed.

Signal processing components 803 provide bi-directional translation between vehicle component signals and aftermarket component signals. Signal processing components 803 process vehicle bus signals and/or SWC signals received from vehicle bus 700 (and as appropriate, steering wheel controls 720) via vehicle interface side 801.

Signal processing components 803 also process signals transmitted by any of the vehicle components over their corresponding direct connections 762-769.

Signal processing components 803 translate the signals received from vehicle components into a signal type or format recognized by aftermarket component 850, and provide the translated signals to aftermarket component interface side 802 to transmit over connection 830 (or connection 840). Additionally, if the signals received via direct connections 762-769 are analog signals, signal processing components convert the signals to a digital format, prior to translating the signal into the signal type or format recognized by aftermarket component 850.

Signal processing components 803 also process signals received from aftermarket component 850 via aftermarket component interface side 802. The aftermarket component signals processed by signal processing components 803 include audio/video signals, along with signals intended to control or provide status updates for the vehicle components illustrated in FIG. 7, as will be later discussed. For signals to be received by vehicle modules via vehicle bus 700, signal processing components 803 translate the aftermarket component signals into bus signals corresponding to the auto-detected type of vehicle bus 700, and provide the translated signals to vehicle interface side 801 to transmit over connection 731. For signals for reception by vehicle modules via direct connections 762-769, signal processing components 803 translate the aftermarket component signals into signals recognized by the respective vehicle modules, and provide the translated signals to vehicle interface side 801 to transmit over the respective direct connection 762-769. If a vehicle module is adapted to receive analog signals over the respective direct connection, signal processing components 803 first convert the corresponding digital signals received from aftermarket component 850 to analog signals, before performing the translation and transmission over the respective direct connection.

As described, interface 800 provides bidirectional translation of signals between vehicle bus 700 and aftermarket component 850. Interface 800 also provides full translation of signals between vehicle modules and aftermarket component 850, including A/D and D/A conversion, to adapt any vehicle modules that send or receive analog signals with aftermarket component 850 which communicates using digital signals. Interface 800 may also provide one-way translation of signals from steering wheel controls 720 to aftermarket component 850 via connections 761, 840.

Figure 10:
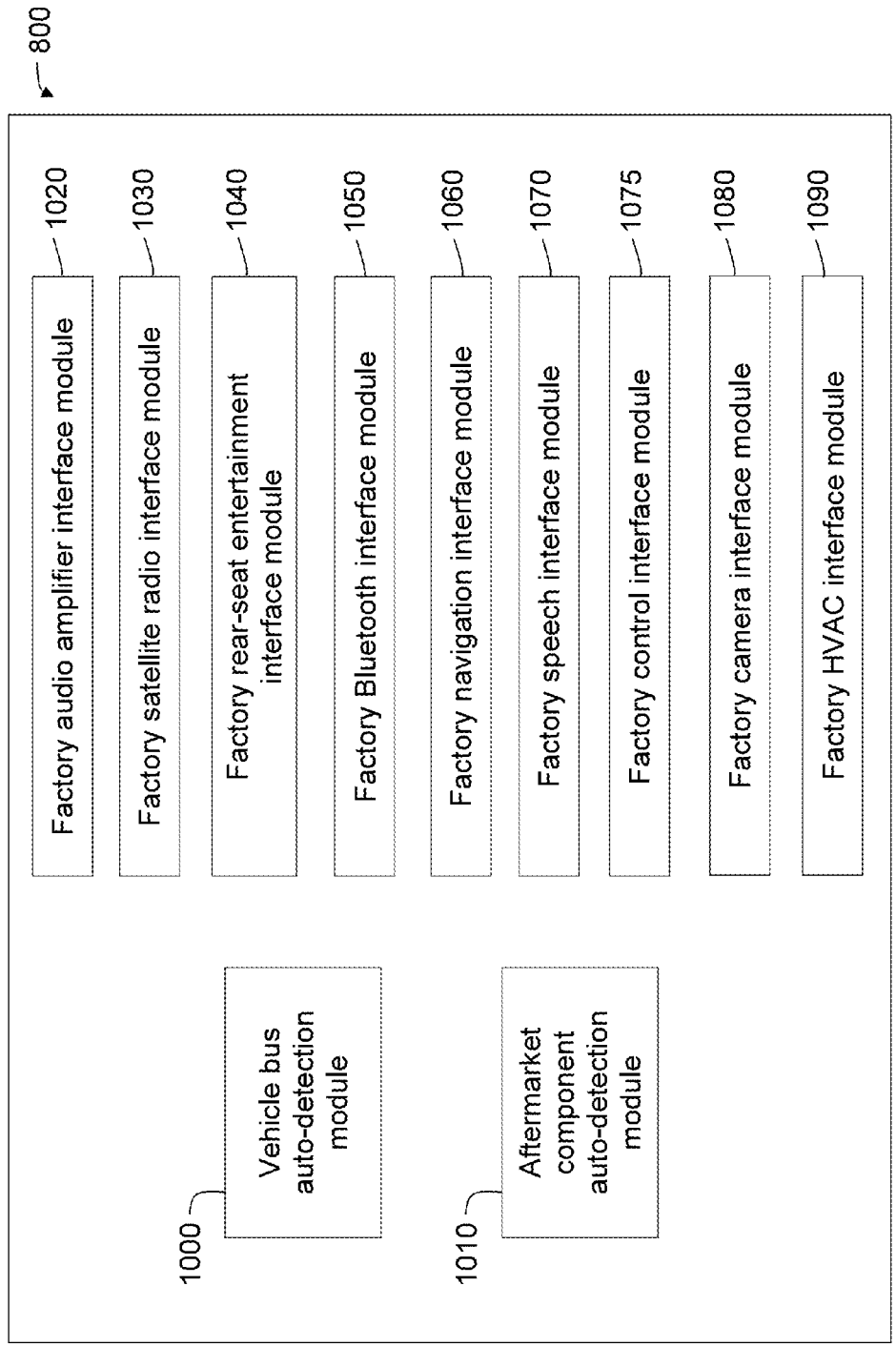
FIG. 10 shows modules provided within the interface, in accordance with the second embodiment of the invention.

FIG. 10 shows the modules that may be provided within interface 800. Interface 800 includes a vehicle bus auto-detection module 1000. Vehicle bus auto-detection module 1000 auto-detects a vehicle configuration including a vehicle bus type, in accordance with the same principles discussed in FIGS. 2C, 4, and 5. That is, vehicle bus auto-detection module 1000 auto-detects the vehicle bus type based on one or more of the vehicle bus frame rate and/or messages transmitted by factory components over vehicle bus 700 that establishes the identity of the type of vehicle bus 700. Vehicle bus auto-detection module 1000 may be provided within vehicle interface side 801.

Interface 800 also includes aftermarket component auto-detection module 1010. Aftermarket component auto-detection module 1010 auto-detects and identifies aftermarket component 850. The auto-detection of aftermarket component 850 may be performed by transmitting queries to aftermarket component 850 over connection 830 and analyzing the response. For instance, aftermarket component auto-detection module 1010 may initiate a USB handshake connection with aftermarket component 850 and request USB host or device information. Alternatively, the auto-detection of aftermarket component 850 may be performed in accordance with the same principles discussed in FIGS. 3-5. Aftermarket component auto-detection module 1010 may be provided within aftermarket component interface side 802.

Interface 800 further includes modules for interfacing with factory components, including factory audio amplifier interface module 1020, factory satellite radio interface module 1030, factory rear-seat entertainment interface module 1040, factory Bluetooth interface module 1050, factory navigation interface module 1060, factory speech interface module 1070, factory control interface module 1075, factory camera interface module 1080, and factory HVAC interface module 1090. These modules may be provided within signal processing components 803. It will be appreciated that these modules may be implemented as software, hardware, or a combination thereof.

Factory audio amplifier module 1020 provides two-way translation of signals between factory audio amplifier 740 and aftermarket component 850, thereby providing full functionality of factory audio amplifier 740 with aftermarket component 850. As factory audio amplifier 740 is designed by the vehicle manufacturer, factory audio amplifier 740 only recognizes, processes, and transmits vehicle bus signals over vehicle bus 700 in accordance with the vehicle manufacturer's proprietary bus protocol format. Factory audio amplifier interface module 1020 receives signals from aftermarket component 830, and translates them to signals of a format recognized by factory audio amplifier 740. One example of aftermarket component signals processed by factory audio amplifier interface module 1020 include audio signals, which are then converted to a format recognized by factory audio amplifier 740 and transmitted over direct connection 764. If factory audio amplifier 740 is configured to receive analog line-level signals, factory audio amplifier interface module 1020 performs D/A conversion to translate the digital audio signals into the analog line-level signals. If factory audio amplifier 740 is configured to receive digital audio signals of a proprietary format, factory audio amplifier interface module 1020 performs the translation to such proprietary format. Another example of such signals include control signals such as adjustment signals for adjusting volume, bass, treble, balance, fade, or any other setting, which are transmitted via vehicle bus 700. Factory audio amplifier interface module 1020 may also receive signals from factory audio amplifier 740 via vehicle bus 700, and translate the signals to a format recognized by aftermarket component 850. Examples of factory audio amplifier signals processed by factory audio amplifier interface module 1020 may include status, confirmation, or acknowledgement signals. Factory audio amplifier interface module 1020 relies on the auto-detected vehicle configuration determined by vehicle bus auto-detection module 1000 to translate the signals into the appropriate format recognized by factory audio amplifier 740, and relies on the auto-detected aftermarket component configuration determined by aftermarket component auto-detection module 1010 to translate the signals into the appropriate format recognized by aftermarket component 850.

Factory satellite radio interface module 1030 provides two-way translation of signals between satellite radio module 741 and aftermarket component 850, thereby providing full functionality of satellite radio module 741 with aftermarket component 850. As satellite radio module 741 is designed by the vehicle manufacturer, satellite radio module 741 only recognizes, processes, and transmits vehicle bus signals over vehicle bus 700 in accordance with the vehicle manufacturer's proprietary bus protocol format. Factory satellite radio interface module 1030 receives signals from satellite radio module 741, and translates them to signals of a format recognized by aftermarket component 850. One example of factory satellite radio signals processed by factory satellite radio interface module 1030 includes audio signals received over direct connection 765, which are first converted to a digital format (if originally in an analog format) and then are translated into digital signals of the format recognized by aftermarket component 850. Another example of such signals includes signals received via vehicle bus 700, such as any information transmitted over satellite radio channels, including text alerts, weather, traffic, etc. Factory satellite radio interface module 1030 also receives signals from aftermarket component 850, and translates them to signals of a format recognized by satellite radio module 741. Examples of aftermarket component signals processed by factory satellite radio interface module 1030 may include control signals to change satellite radio stations, and status, confirmation, and acknowledgement signals, which are translated and transmitted over vehicle bus 700. Factory satellite radio interface module 1030 relies on the auto-detected vehicle configuration determined by vehicle bus auto-detection module 1000 to translate the signals into the appropriate format recognized by satellite radio module 741, and relies on the auto-detected aftermarket component configuration determined by aftermarket component auto-detection module 1010 to translate the signals into the appropriate format recognized by aftermarket component 850.

Factory rear-seat entertainment interface module 1040 provides two-way translation of signals between rear-seat entertainment 751 and aftermarket component 850, thereby providing full functionality of rear-seat entertainment 751 with aftermarket component 850. As rear-seat entertainment 751 is designed by the vehicle manufacturer, rear-seat entertainment 751 only recognizes, processes, and transmits vehicle bus signals over vehicle bus 700 in accordance with the vehicle manufacturer's proprietary bus protocol format. Factory rear-seat entertainment interface module 1040 receives signals from rear-seat entertainment module 751, and translates them to signals of a format recognized by aftermarket component 850. Examples of factory rear-seat entertainment signals processed by factory rear-seat entertainment interface module 1040 may include control signals to change audio or video source playback, status, confirmation, and acknowledgement signals, received via vehicle bus 700. Factory rear-seat entertainment interface module 1040 also receives signals from aftermarket component 850, and translates them to signals of a format recognized by rear-seat entertainment module 751. One example of aftermarket component signals processed by factory rear-seat entertainment interface module 1040 includes audio and/or video signals, which are then converted to a format recognized by rear-seat entertainment module 751 and transmitted over direct connection 769. If rear-seat entertainment module 751 is configured to receive analog A/V signals, factory rear-seat entertainment interface module 1040 performs D/A conversion to translate the digital A/V signals into the analog signals. If rear-seat entertainment module 751 is configured to receive digital A/V signals of a proprietary format, factory rear-seat entertainment interface module 1040 performs the translation to such proprietary format. Another example of aftermarket component signals processed by factory rear-seat entertainment interface module 1040 includes status or control signals, transmitted over vehicle bus 700. Factory rear-seat entertainment interface module 1040 relies on the auto-detected vehicle configuration determined by vehicle bus auto-detection module 1000 to translate the signals into the appropriate format recognized by rear-seat entertainment module 751, and relies on the auto-detected aftermarket component configuration determined by aftermarket component auto-detection module 1010 to translate the signals into the appropriate format recognized by aftermarket component 850.

Factory Bluetooth interface module 1050 provides two-way translation of signals between Bluetooth module 742 and aftermarket component 850, thereby providing full functionality of Bluetooth module 742 with aftermarket component 850. As Bluetooth module 742 is designed by the vehicle manufacturer, Bluetooth module 742 only recognizes, processes, and transmits vehicle bus signals over vehicle bus 700 in accordance with the vehicle manufacturer's proprietary bus protocol format. While Bluetooth module 742 relies upon the established Bluetooth protocol to communicate with a Bluetooth device, Bluetooth module 742 may convert these signals to the proprietary vehicle bus format to communicate with other components such as factory stereo 730. For instance, such proprietary signals provided between Bluetooth module 742 and factory stereo 730 via vehicle bus 700 may include telephone commands (e.g., call-waiting, dial, hang-up), or any other commands achieved via Bluetooth. Bluetooth module 742 also transmits audio signals for telephone calls and streaming audio via direct connection 766, which factory Bluetooth interface module 1050 processes by first converting to a digital format (if originally in an analog format) and then translating into digital signals of the format recognized by aftermarket component 850. Factory Bluetooth interface module 1050 translates the signals such that aftermarket component 850 may utilize Bluetooth module 742 for full Bluetooth functionality, including hands-free telephone, streaming audio, and any other Bluetooth features. Factory Bluetooth interface module 1050 relies on the auto-detected vehicle configuration determined by vehicle bus auto-detection module 1000 to translate the signals into the appropriate format recognized by Bluetooth module 742, and relies on the auto-detected aftermarket component configuration determined by aftermarket component auto-detection module 1010 to translate the signals into the appropriate format recognized by aftermarket component 850.

Factory navigation interface module 1060 provides two-way translation of signals between navigation module 743 and aftermarket component 850. As navigation module 743 is designed by the vehicle manufacturer, navigation module 743 only recognizes, processes, and transmits vehicle bus signals over vehicle bus 700 in accordance with the vehicle manufacturer's proprietary bus protocol format. Factory navigation interface module 1060 receives signals from navigation module 743, and translates them to signals of a format recognized by aftermarket component 850. One example of factory navigation signals processed by factory navigation interface module 1060 include the continuously-updating video map data transmitted via direct connection 767, which are first converted to a digital format (if originally in an analog format) and then are translated into digital signals of the format recognized by aftermarket component 850. Another example of factory navigation signals processed by factory navigation interface module 1060 includes status, confirmation, and acknowledgement signals transmitted via vehicle bus 700. Factory navigation interface module 1060 also receives signals from aftermarket component 850, and translates them to signals of a format recognized by navigation module 743. Examples of aftermarket component signals processed by factory navigation interface module 1060 may include control commands for adjusting the video map, transmitted via vehicle bus 700. Factory navigation interface module 1060 relies on the auto-detected vehicle configuration determined by vehicle bus auto-detection module 1000 to translate the signals into the appropriate format recognized by navigation module 743, and relies on the auto-detected aftermarket component configuration determined by aftermarket component auto-detection module 1010 to translate the signals into the appropriate format recognized by aftermarket component 850.

Factory speech interface module 1070 provides two-way translation of signals between speech module 744 and aftermarket component 850. As speech module 744 is designed by the vehicle manufacturer, speech module 744 only recognizes, processes, and transmits vehicle bus signals over vehicle bus 700 in accordance with the vehicle manufacturer's proprietary bus protocol format. Factory speech interface module 1070 receives signals from speech module 744, and translates them to signals of a format recognized by aftermarket component 850. Examples of factory speech signals processed by factory speech interface module 1070 may include text-to-speech audio clips transmitted via direct connection 768, and status, confirmation, and acknowledgement signals transmitted via vehicle bus 700. Factory speech interface module 1070 also receives signals from aftermarket component 850, and translates them to signals of a format recognized by speech module 744. Examples of aftermarket component signals processed by factory speech interface module 1070 may include requests to process recorded voice commands and any other speech processing transmitted via direct connection 768, and control and status signals transmitted via vehicle bus 700. Factory speech interface module 1070 relies on the auto-detected vehicle configuration determined by vehicle bus auto-detection module 1000 to translate the signals into the appropriate format recognized by speech module 744, and relies on the auto-detected aftermarket component configuration determined by aftermarket component auto-detection module 1010 to translate the signals into the appropriate format recognized by aftermarket component 850.

Factory control interface module 1075 provides one-way or two-way translation of signals between both central control module 745 and steering wheel controls 760, and aftermarket component 850. As central control module 745 and steering wheel controls 760 are designed by the vehicle manufacturer, these modules only recognize, process, and/or transmit vehicle bus signals over vehicle bus 700 in accordance with the vehicle manufacturer's proprietary bus protocol format (or in accordance with a proprietary electrical format, for some steering wheel controls). While these factory controls generally only transmit signals and do not receive signals, they may optionally be configured on some vehicles to also receive signals for improved user experience, for user feedback (e.g., haptic feedback), for periodic status updates, diagnostics, or other purposes. Factory control interface module 1075 receives signals from central control module 745 and steering wheel controls 760, and translates them to signals of a format recognized by aftermarket component 850. Examples of factory signals processed by factory control interface module 1075 may include steering wheel control signals, directional control inputs, scrolling or wheel inputs, or any other user inputs provided by central control module 745 and steering wheel controls 760. Factory control interface module 1075 may also receive signals from aftermarket component 850, and translates them to signals of a format recognized by central control module 745 and/or steering wheel controls 760. Examples of aftermarket component signals processed by factory control interface module 1075 may include, for instance, haptic feedback activation signals, and status, confirmation, and acknowledgement signals. Factory control interface module 1075 relies on the auto-detected vehicle configuration determined by vehicle bus auto-detection module 1000 to translate the signals into the appropriate format recognized by central control module 745 and/or steering wheel controls 760, and relies on the auto-detected aftermarket component configuration determined by aftermarket component auto-detection module 1010 to translate the signals into the appropriate format recognized by aftermarket component 850. It is noted that these signals may be provided via either (or even both) of connections 830 or 840, regardless of which of connection 731 or connection 761 provides the signals.

Factory camera interface module 1080 provides two-way translation of signals between backup camera 750 and aftermarket component 850. As backup camera 750 is designed by the vehicle manufacturer, backup camera 750 only recognizes, processes, and transmits vehicle bus signals over vehicle bus 700 in accordance with the vehicle manufacturer's proprietary bus protocol format. Factory camera interface module 1080 receives signals from backup camera 750, and translates them to signals of a format recognized by aftermarket component 850. Examples of factory backup camera signals processed by factory camera interface module 1080 may include streaming video, distance, and collision avoidance signals, transmitted via either direct connection 750 and/or vehicle bus 700, as applicable. Factory camera interface module 1080 also receives signals from aftermarket component 850, and translates them to signals of a format recognized by backup camera 750. Examples of aftermarket component signals processed by factory camera interface module 1080 may include camera adjustment commands, and status, confirmation, and acknowledgement signals, transmitted over vehicle bus 700. Factory camera interface module 1080 relies on the auto-detected vehicle configuration determined by vehicle bus auto-detection module 1000 to translate the signals into the appropriate format recognized by backup camera 750, and relies on the auto-detected aftermarket component configuration determined by aftermarket component auto-detection module 1010 to translate the signals into the appropriate format recognized by aftermarket component 850.

Factory HVAC interface module 1090 provides two-way translation of signals between HVAC control module 770 and aftermarket component 850. As HVAC control module 770 is designed by the vehicle manufacturer, HVAC control module 770 only recognizes, processes, and transmits vehicle bus signals over vehicle bus 700 in accordance with the vehicle manufacturer's proprietary bus protocol format. Factory HVAC interface module 1090 receives signals from HVAC control module 770, and translates them to signals of a format recognized by aftermarket component 850. Examples of factory HVAC signals processed by factory HVAC interface module 1090 may include status, confirmation, and acknowledgement signals. Factory HVAC interface module 1090 also receives signals from aftermarket component 850, and translates them to signals of a format recognized by HVAC control module 770. Examples of aftermarket component signals processed by factory HVAC interface module 1090 may include control signals to change HVAC controls. Factory HVAC interface module 1090 relies on the auto-detected vehicle configuration determined by vehicle bus auto-detection module 1000 to translate the signals into the appropriate format recognized by HVAC control module 770, and relies on the auto-detected aftermarket component configuration determined by aftermarket component auto-detection module 1010 to translate the signals into the appropriate format recognized by aftermarket component 850.

Figure 11:
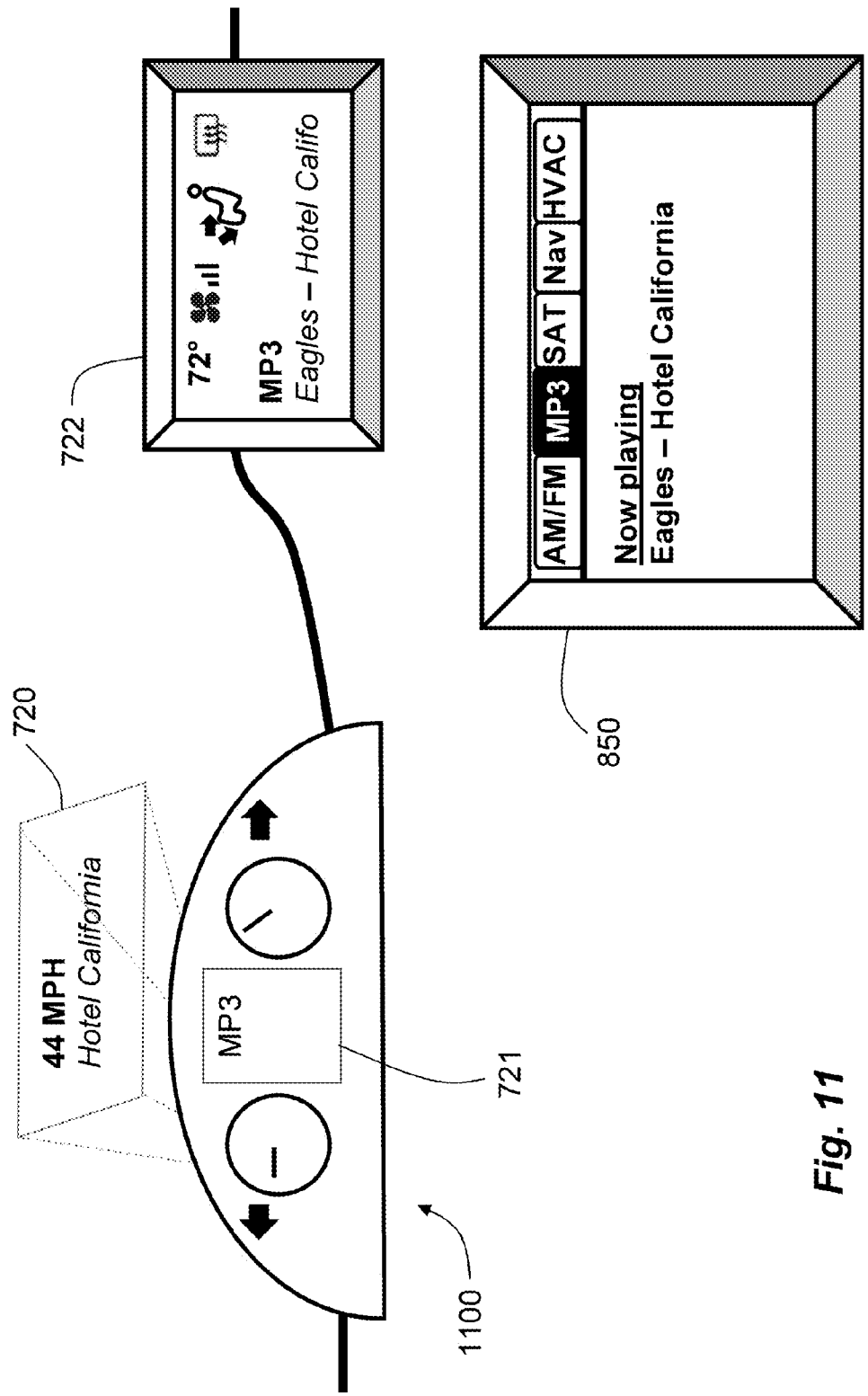
FIG. 11 shows a first example of vehicle operation in accordance with the second embodiment of the invention.

FIG. 11 shows a first example of vehicle operation in accordance with the second embodiment of the invention. The vehicle includes heads-up display 720, central information display 722, and an instrument cluster 1100 that contains instrument cluster display 721. The vehicle also includes aftermarket component 850 that has been installed in place of a previously-installed factory stereo 730. In this example, aftermarket component 850 is an aftermarket stereo having a touchscreen display. However, it will be appreciated that other aftermarket components 850 may be applicable with this aspect of the invention.

As illustrated in FIG. 11, aftermarket component 850 is adapted to provide various entertainment sources based on functionality contained within aftermarket component 850. These sources may include, for example as illustrated in FIG. 11, AM/FM radio and MP3 playback from a data storage source (e.g., data CD, MP3 player, USB flash drive). Aftermarket component 850 is also adapted to provide other functions based on modules originally installed in the vehicle to interface with factory stereo 730. These sources may include, for example as illustrated in FIG. 11, satellite radio (provided via factory-installed satellite radio module 741) and navigation (provided via factory-installed navigation module 743). Aftermarket component 850 may also adapted to provide additional functions such as HVAC control, to replicate HVAC controls 771 that were lost when replacement of factory stereo 730 with aftermarket component 850 required removal of an integrated dashboard originally containing HVAC controls 771. The HVAC control provided by aftermarket component 850 will be described further in FIG. 12.

In the example of FIG. 11, the vehicle, when factory stereo 730 was previously installed, may be configured to display song information on one or more of heads-up display 720, instrument cluster display 721, and central information display 722. This feature is conventionally lost when factory stereo 730 is replaced with aftermarket component 850. However, with the features of interface 800, this feature is reestablished.

As seen in FIG. 11, an MP3 tab has been selected in aftermarket component 850 for adjusting MP3 playback settings. In the example of FIG. 11, heads-up display 720 and central information display 722 display the current song being played by aftermarket component 850, while instrument cluster display 721 displays the current audio source. However, it will be appreciated that any number of variations may be provided in the specific information displayed. Each of the displays receives the song information via signals transmitted over vehicle bus 700 by interface 800, which in turn receives song information from aftermarket component 850 via connection 830 and translates the information into corresponding vehicle bus signals and commands to achieve the song display.

In addition, if the MP3 progresses to the next song in the playlist, each of heads-up display 720, instrument cluster display 721, and central information display 722 may transition from the default displayed information to momentarily display the song details.

Figure 12:
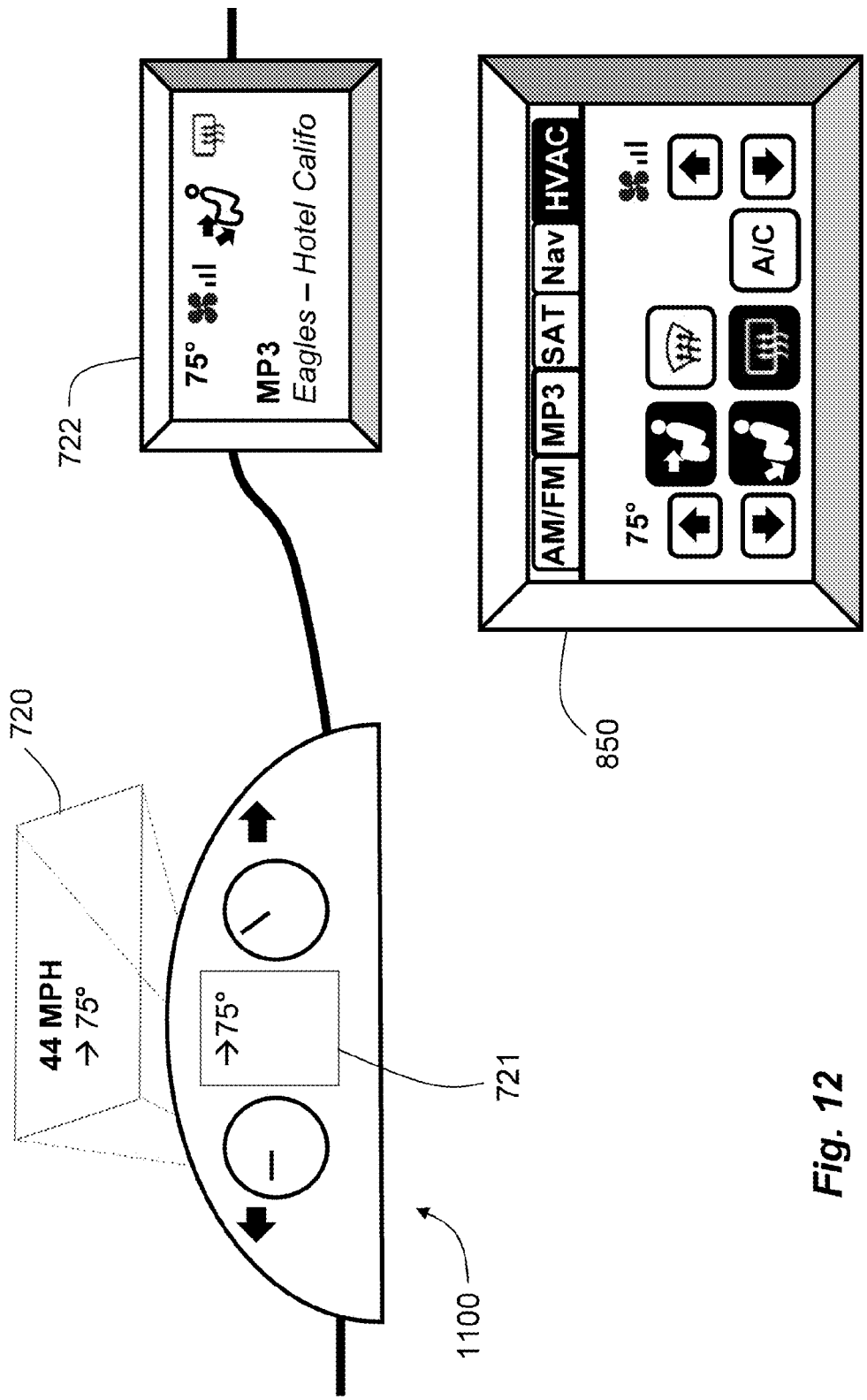
FIG. 12 shows a second example of vehicle operation in accordance with the second embodiment of the invention.

FIG. 12 shows a second example of vehicle operation in accordance with the second embodiment of the invention. As seen in FIG. 12, an HVAC tab has been selected in aftermarket component 850 for adjusting HVAC settings. In the example of FIG. 12, HVAC adjustments made according to adjustments on aftermarket component 850 are transmitted via connection 830 to interface 800. Factory HVAC interface module 1080 within interface 800 processes these signals, and translates them to HVAC adjustment signals recognizable by HVAC control module 770. Interface 800 transmits these signals over vehicle bus 700, such that HVAC control module 770 is controlled accordingly.

The updated HVAC adjustments may be displayed on one or more of heads-up display 720, instrument cluster display 721, and central information display 722. In the example of FIG. 12, central information display 722 displays all HVAC settings, while heads-up display 720 and instrument cluster display 721 only displays the updated temperature of 75°. However, it will be appreciated that any number of variations may be provided in the specific information displayed. Each of the displays receives the HVAC information via signals transmitted over vehicle bus 700 by interface 800, which in turn receives HVAC adjustment information from aftermarket component 850 via connection 830 and translates the information into corresponding vehicle bus signals and commands to achieve the HVAC adjustment display.

It will be appreciated that FIGS. 11 and 12 are merely examples of MP3 and HVAC operations according to the respective modules within interface 800 as illustrated in FIG. 10, but that all the modules in FIG. 10 may be used in connection with their respective vehicle modules and aftermarket component 850 to provide such functionality via aftermarket component 850. That is, use of factory audio amplifier 740, satellite radio module 741, Bluetooth module 742, navigation module 743, speech module 744, central control module 745, rear-seat entertainment 751, backup camera 750, steering wheel controls 760, and HVAC control module 770 are regained with interface 800, and operation is provided seamlessly through the two-way translation provided by interface 800, in accordance with the display and user inputs provided via aftermarket component 850. It will also be appreciated that interface 800 may potentially have the ability to communicate with any other vehicle modules to maximize the retention of factory-installed functions.

As previously mentioned, connection 830 is preferably a wired connection, and is even more preferably a USB connection. Utilizing a USB connection type allows interface 800 to take advantage of an industry-standard port that already exists on many aftermarket components. In such an instance, existing aftermarket components may be upgradable (e.g., via software or firmware updates) to provide functionality for controlling factory-installed vehicle features via interface 800. And, new aftermarket components may provide such functionality built-in. It will also be appreciated that interface 800 may alternatively transfer software modules to aftermarket component 850 via the USB connection to activate this functionality.

Interface 800 and aftermarket component 850 may use one or more standard USB communication modes. For instance, interface 800 and aftermarket component 850 may incorporate the USB Device Class Definition for Audio Devices standard to provide digital audio streaming, effectively providing aftermarket component 850 with digital line-in and line-out capabilities. As such, interface 800 may translate streaming satellite radio, Bluetooth, navigation, and speech audio signals from satellite radio module 741, Bluetooth module 742, navigation module 743, and speech module 744, respectively, from either an analog line-level format or the vehicle manufacturer's proprietary digital transmission format to the USB digital audio streaming format and transmit such translated data over connection 830 to aftermarket component 850. Interface 800 may also rely upon this format to provide voice prompts generated by vehicle information processor 710 (e.g., Onstar or Ford Sync prompts) to aftermarket component 850 for playback.

Interface 800 may also receive digital audio streaming from aftermarket component 850 as a line-out signal, which interface 800 translates to an analog or proprietary digital format recognized by factory audio amplifier 740 for amplification and output via the vehicle's speakers. This approach allows aftermarket component 850 to re-use the factory-installed amplifier.

Interface 800 and aftermarket component 850 may incorporate the USB Human Interface Device class for other communication, including bi-directional data transfers. These transmissions are performed according to a pre-established packet protocol within aftermarket component 850, which is recognized by interface 800, via the previously-described auto-detecting of aftermarket component 850. It will be appreciated that different manufacturers and/or models of aftermarket components may utilize different protocol formats, and that interface 800 may rely on its auto-detection of aftermarket component 850 to determine the correct protocol format.

Interface 800 may utilize the USB format to auto-detect aftermarket component 850, by receiving identification information sufficient for such auto-detection. That is, aftermarket component 850, when first connected via USB to interface 800, may provide an identifier to interface 800, such as during a handshake process. This identifier may itself sufficiently identify the type of aftermarket component 850. If the identifier is insufficient, interface 800 may transmit USB packets to aftermarket component 850 to advance the identification of aftermarket component 850, depending on the response received when the transmitted USB packets are processed by aftermarket component 850.

It will be appreciated that when connection 830 is established via a USB format, either interface 800 or aftermarket component 850 may be the USB host, and the other of the two is the attached USB device. However, it may be preferable to select aftermarket component 850 as the USB host, as aftermarket component 850 may already be configured to serve as a USB host for attaching USB peripherals such as MP3 players and USB flash drives.

Interface 800 may also provide an option to manually configure the selected vehicle bus type and selected aftermarket component type, in the event that the auto-detection of the respective types are unsuccessful.

It will also be appreciated that the aftermarket component 850 is not limited to aftermarket stereos, but may include other electronic devices such as cellular telephones (e.g., smartphones) and tablets. Examples of such devices include, but are not limited to, all devices operating on Apple iOS, Google Android, Windows Mobile or Windows Phone, or Blackberry operating systems. When aftermarket component 850 is a smartphone or tablet, connection 830 preferably remains a USB connection, but may alternatively be any other data connection compatible with the smartphone or tablet, including Wi-Fi or Bluetooth. The interface 800 is configured to communicate with the smartphone or tablet, providing bi-directional translation of signals in the same manner as with an aftermarket stereo. The smartphone or tablet may include software that provides a user interface similar to that found on aftermarket stereos. Using interface 800, the smartphone or tablet may be able to control some or all of the previously-described vehicle functions and modules using the smartphone or tablet interface (e.g., touchscreen). As one example, the smartphone or tablet may control and output audio data to interface 800, which is translated and provided to factory audio amplifier 740, thereby allowing the smartphone or tablet to be used as the vehicle's audio controller in lieu of a separate aftermarket stereo. With interface 800 having the ability to communicate with smartphones and tablets, a user replacing a factory stereo is provided with additional replacement options, including the ability to integrate an already-purchased device such as a smartphone or tablet, obviating the need to additionally purchase an aftermarket stereo.

It will further be appreciated that interface 800 is not limited to a single connection 830 with a single aftermarket components 850, but may alternatively include multiple such connections with multiple aftermarket components. As one example, interface 800 may include two USB ports, one being connected to an aftermarket stereo, and the other being connected to a smartphone or tablet. In this manner, the aftermarket components may be adapted to control various vehicle functions in combination via interface 800. Or, vehicle controls may be divided between the aftermarket components (e.g., aftermarket stereo controls audio functions, while smartphone controls HVAC). The interface 800 provides bidirectional translation of signals between vehicle bus 700 and all connected aftermarket components.

In the foregoing description, example aspects of the present invention are described with reference to specific example embodiments. Despite these specific embodiments, many additional modifications and variations would be apparent to those skilled in the art. Thus, it is to be understood that example embodiments of the invention may be practiced in a manner other than those specifically described. For example, although one or more example embodiments of the invention may have been described in the context of steering wheel control components, in practice the example embodiments may include interfaces that auto-detect vehicle and aftermarket component configurations for the purpose of transmitting signals other than SWC signals. Accordingly, the specification is to be regarded in an illustrative rather than restrictive fashion. It will be evident that modifications and changes may be made thereto without departing from the broader spirit and scope.

Similarly, it should be understood that the figures are presented solely for example purposes. The architecture of the example embodiments presented herein is sufficiently flexible and configurable such that it may be practiced in ways other than that shown in the accompanying figures.

Furthermore, the purpose of the foregoing abstract is to enable the U.S. Patent and Trademark Office, the general public, and scientists, engineers, and practitioners in the art who are unfamiliar with patent or legal terms or phrases, to quickly determine from a cursory inspection the nature and essence of the technical disclosure of the application. The abstract is not intended to limit the scope of the present invention in any way. It is also to be understood that the processes recited in the claims need not be performed in the order presented.

What is claimed is:

1. A method of connecting an aftermarket component with a vehicle using an interface apparatus in order to provide communication between said vehicle and said aftermarket component, said interface apparatus connected via a first connection to a factory data bus of the vehicle which transports signals according to a first data format, the interface apparatus further connected via a USB port to a data channel of the aftermarket component which transports signals according to a second data format, the interface apparatus including at least one processor, the method comprising:

auto-detecting, via the at least one processor, a factory data bus type corresponding to the factory data bus, out of a plurality of potential factory data bus types, wherein said auto-detecting of said factory data bus type includes, (i) performing a first measurement on said factor data bus, said first measurement being performed by said interface apparatus, and (ii) identifying said factory data bus type among a plurality of possible types of said factory data buses;

receiving digital signals from the aftermarket component via said USB port, the digital signals being in the second data format, the second data format corresponding to the aftermarket component;

auto-detecting, via the at least one processor, an aftermarket component type of said aftermarket component, wherein said auto-detecting of said aftermarket component type includes, (i) receiving said digital signals from said aftermarket component over said USB port, and (ii) using said digital signals to identify an aftermarket component type among a plurality of possible types;

identifying said first data format according to said factory data bus type;

identifying said second data format according to said aftermarket component type;

translating the digital signals from the second data format into the first data format according to the type of factory data bus and the aftermarket component type; and transmitting the translated digital signals in the first data format to the vehicle via the first connection.

2. A method according to claim 1, wherein the aftermarket component is an aftermarket stereo that has replaced a factory-installed stereo.

3. A method according to claim 1, wherein the aftermarket component is a cellular telephone or a tablet.

4. A method according to claim 1, further comprising:
receiving analog signals from the vehicle via a third connection between the interface apparatus and the vehicle;
digitizing the analog signals;
translating the digitized analog signals into the second data format; and
transmitting the translated digitized analog signals to the aftermarket component via the second connection.

5. A method according to claim 1, wherein the identifying step for said factory data bus includes:
identifying a frame rate of the factory data bus;
identifying the factory data bus type out of the plurality of potential factory data bus types, based at least partially on the identified frame rate.

6. A method according to claim 1, wherein the translated digital signals transmitted to the vehicle include signals to control a factory-installed display on the vehicle.

7. A method according to claim 1, wherein the translated digital signals transmitted to the vehicle include signals to control a factory-installed satellite radio module on the vehicle.

8. A method according to claim 1, wherein the translated digital signals transmitted to the vehicle include signals to control a factory-installed Bluetooth module on the vehicle.

9. A method according to claim 1, wherein the translated digital signals transmitted to the vehicle include signals to control a heating and air-conditioning module on the vehicle.

10. A method according to claim 1, wherein the translated digital signals transmitted to the vehicle include signals to control a factory-installed amplifier on the vehicle.

11. A method according to claim 1, wherein the translated digital signals transmitted to the vehicle include signals to control a factory-installed navigation module on the vehicle.

12. A method according to claim 1, wherein the translated digital signals transmitted to the vehicle include signals to control a factory-installed speech module on the vehicle.

13. A method according to claim 4, wherein the analog signals received from the vehicle via the third connection include video signals from a factory-installed camera.

14. A method according to claim 1, further comprising:
receiving digital signals from the vehicle via the first connection, the digital signals being in the first data format;
translating the digital signals into the second data format; and
transmitting the translated digital signals in the second data format to the aftermarket component via the second connection.

15. A method according to claim 14, wherein the translated digital signals transmitted to the aftermarket component include status signals from a factory-installed heating and air-conditioning module on the vehicle.

16. A method according to claim 14, wherein the translated digital signals transmitted to the aftermarket component include control signals from factory-installed steering wheel controls or from a factory-installed central control module.

17. An apparatus comprising:
a vehicle-interface unit electrically connectable to a factory data bus of a vehicle via a first connection, the vehicle-interface unit being adapted to identify a factory data bus type corresponding to the factory data bus, out of a plurality of potential factory data bus types, and transmit and receive digital signals via the first connection according to a first data format corresponding to the identified factory data bus type;

an aftermarket-component-interface unit electrically connectable to a data channel of an aftermarket component via a USB Port, the aftermarket-component-interface unit being adapted to transmit and receive digital signals via the USB Port according to a second data format corresponding to the aftermarket component; and a signal processing unit, said vehicle interface unit adapted to auto-detect a type of said factory data bus, by,
(i) performing a first measurement on said factory data bus, and
(ii) identifying said type of said factory data bus among a plurality of possible types of said factory data buses;

said aftermarket-component-interface adapted to auto-detect a type of said aftermarket component, by,
(i) receiving digital signals from said aftermarket component over said USB Port, and
(ii) using said digital signals received to identify an aftermarket component type among a plurality of possible types;

wherein the signal processing unit is adapted to identify said first data format according to said factory data bus type;

wherein the signal processing unit is adapted to identify said second data format according to said aftermarket component type;

wherein the signal processing unit is adapted to translate signals of the first data format, received by the vehicle-interface unit via the first connection, into signals of the second data format, and the aftermarket-component-interface unit is adapted to transmit, to the aftermarket component via the second connection, the signals translated by the signal processing unit from the first data format to the second data format, and wherein the signal processing unit is adapted to translate signals of the second data format, received by the aftermarket-component-interface unit via the second connection, into signals of the first data format, and the vehicle-interface unit is adapted to transmit, to a vehicle component via the first connection, the signals translated by the signal processing unit from the second data format to the first data format.

18. A method according to claim 4, wherein the analog signals received from the vehicle via the third connection include audio signals from a factory-installed satellite radio module or a factory-installed Bluetooth module.

19. An apparatus according to claim 17, wherein the vehicle-interface unit is further electrically connectable to the vehicle via a third connection, and is adapted to receive audio or video signals via the third connection from a factory-installed vehicle module, wherein the signals translated by the signal processing unit from the first data format to the second data format and transmitted by the vehicle-interface unit via the first connection include signals to control the aftermarket component, and wherein the signal processing unit is adapted to translate the audio or video signals, received by the vehicle-interface unit via the first connection, into signals of the second data format, for transmission by the aftermarket-component-interface unit to the aftermarket component.

20. An apparatus according to claim 19, wherein the factory-installed vehicle module includes at least one of a factory-installed satellite radio module, a factory-installed backup camera, a factory-installed navigation module, and a factory-installed speech module.

21. An apparatus according to claim 17, wherein the aftermarket component is an aftermarket stereo that has replaced a factory-installed stereo.

22. An apparatus according to claim 17, wherein the aftermarket component is a cellular telephone or a tablet.

23. An apparatus according to claim 17, wherein the vehicle-interface unit is further electrically connectable to the vehicle via a third connection, and is adapted to transmit audio or video signals via the third connection to a factory-installed vehicle module, wherein the signals translated by the signal processing unit from the second data format to the first data format and transmitted by the vehicle-interface unit via the first connection include signals to control the factory-installed vehicle module, and wherein the signal processing unit is adapted to translate signals of the second data format, received by the aftermarket-component-interface unit via the second connection, into the audio or video signals for transmission by the vehicle-interface unit to the factory-installed vehicle module.

24. An apparatus according to claim 17, wherein the audio or video signals are of a third format, the third format being different from the first data format and the second data format.

25. An apparatus according to claim 17, wherein the factory-installed vehicle module includes at least one of a factory audio amplifier interface module and a factory video display module.

26. An apparatus according to claim 19, wherein the audio or video signals are of a third format, the third format being different from the first data format and the second data format.

* * * * *